United States Patent [19]

Keefer

[11] Patent Number: 5,082,473
[45] Date of Patent: Jan. 21, 1992

[54] EXTRACTION AND CONCENTRATION OF A GAS COMPONENT

[76] Inventor: Bowie G. Keefer, 4324 West 11th Ave., Vancouver, Canada, V6R 2M1

[21] Appl. No.: 557,132

[22] Filed: Jul. 23, 1990

[51] Int. Cl.⁵ .............................................. B01D 53/04
[52] U.S. Cl. ........................................... 55/25; 55/28; 55/33; 55/58; 55/62; 55/68; 55/74; 55/75; 55/179; 55/387; 55/389
[58] Field of Search ............... 55/25, 26, 28, 31, 33, 55/58, 62, 68, 74, 75, 160–163, 179, 387, 389

[56] References Cited

U.S. PATENT DOCUMENTS

| | | | |
|---|---|---|---|
| 3,121,625 | 2/1964 | Broughton | 55/58 |
| 3,155,468 | 11/1964 | de Montgareuil et al. | 55/58 X |
| 3,164,454 | 1/1965 | Wilson | 55/58 X |
| 3,619,984 | 11/1971 | Domine et al. | 55/58 X |
| 4,169,715 | 10/1979 | Eriksson | 55/389 X |
| 4,194,891 | 3/1980 | Earls et al. | 55/26 |
| 4,354,859 | 10/1982 | Keller, II et al. | 55/25 |
| 4,386,945 | 6/1983 | Gardner | 55/26 |
| 4,406,675 | 9/1983 | Dangieri et al. | 55/26 |
| 4,496,376 | 1/1985 | Hrodek | 55/389 X |
| 4,636,226 | 1/1987 | Canfora | 55/389 X |
| 4,673,415 | 6/1987 | Stanford | 55/389 X |
| 4,702,903 | 10/1987 | Keefer | 55/28 X |
| 4,758,252 | 7/1988 | Lerner et al. | 55/25 |
| 4,769,053 | 9/1988 | Fischer, Jr. | 55/389 |
| 4,793,837 | 12/1988 | Pontius | 55/389 X |
| 4,801,308 | 1/1989 | Keefer | 55/28 X |
| 4,816,121 | 3/1989 | Keefer | 55/28 X |
| 4,869,733 | 9/1989 | Stanford | 55/389 X |
| 4,968,329 | 11/1990 | Keefer | 55/28 X |

Primary Examiner—Robert Spitzer

[57] ABSTRACT

Pressure swing adsorption separation of a gas mixture, containing a first component and also a second component which may be at low or trace concentrations, is performed to extract the second component from the gas mixture so that a first product stream containing the first component may be substantially purified with respect to the second component, while the second component is concentrated to a high degree in a second product stream. Gas mixtures containing three components may also be separated. The apparatus of the invention performs the separation within a single working space.

44 Claims, 14 Drawing Sheets

EXTRACTION AND CONCENTRATION OF A GAS COMPONENT

The present invention is a continuation-in-part of my copending U.S. patent application Ser. No. 07/252,984, filed on Oct. 1, 1988, now U.S. Pat. No. 4,968,329, which itself was a continuation of my abandoned U.S. patent application Ser. No. 07/112,111 filed on Oct. 26, 1987.

TECHNICAL FIELD

The invention relates to separations conducted in the gas or vapour phase, and particularly to extraction and concentration of a component initially present at low or trace concentrations. The component to be extracted and concentrated may be a valuable substance whose recovery and concentration to useful levels is desired, or may be a toxic or environmentally deleterious substance whose removal and concentration for disposal is required.

BACKGROUND ART

Gas separation by pressure swing adsorption is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed, and is reduced during intervals of flow in the reverse direction. As the cycle is repeated, the less readily adsorbed component in concentrated in the first direction, while the more readily adsorbed component is concentrated in the reverse direction.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. Typically, the desired product is the less readily adsorbed fraction, which has been purified by substantial removal of the more readily adsorbed component. If the desired product component is present as a large fraction (greater than about 10% or 20%) of the feed gas mixture, and the adsorbent is sufficiently selective between the components, the desired product component can be purified to a high degree, although only incompletely recovered since some of the product is used to purge the adsorbent bed and is exhausted. If the component to be separated is present only as a small fraction (less than 1%) of the feed gas mixture, the conventional process cannot achieve satisfactory concentration of this component.

The conventional pressure swing adsorption process also makes inefficient use of applied energy, because of irreversible expansion over the valves while switching the adsorbent beds between higher and lower pressures.

The prior art includes pressure swing adsorption devices with improved capability for approaching complete separation of binary mixtures. Keller (U.S. Pat. No. 4,354,859) has disclosed a single bed pressure swing adsorption device, with mechanical volume displacement means cycling at the same frequency at both ends of the adsorbent bed, and with a specified range of phase angles between the two volume displacement means which are required to have unequal displacements, such that the displacement ratio of the smaller to the larger volume displacement means is in the specified range of about 0.15 to 0.65. The volume displacement means may be pistons or diaphragms. The feed mixture is introduced to an intermediate point of the adsorbent bed, and the product components are separated to either end. Keller showed experimentally that his device could achieve approximately complete separation of gas mixtures such as dry air and a 50/50 mixture of hydrogen and methane.

Other devices using cyclically operated volume displacement means at both ends of an adsorbent bed are disclosed in my U.S. Pat. No. 4,702,903 in which a temperature gradient is imposed on the adsorbent bed, my U.S. Pat. No. 4,801,308 in which the adsorbent bed is itself cyclically expanded and contracted, and my U.S. Pat. No. 4,816,121 which is concerned with separation of chemically reactive gases.

Relative to the above cited prior art, the present invention provides an improved process and apparatus for separating the components of binary gas mixtures with simultaneous substantial purification and high recovery of both components, particularly in applications where one component is initially present at low or trace concentrations.

While prior art adsorptive gas separation systems using a single working volume are capable of purifying a carrier gas and removing a trace gas phase component to a high degree, they have not been capable of simultaneously concentrating the trace component to a high degree, as is achieved in the present invention.

DISCLOSURE OF INVENTION

In a single working volume, this device has a flow path through a series of interconnected adsorbent beds or absorbent bed segments. The flow path has two ends, or may be branched to have three or more ends. A number of reciprocating cyclic volume displacement means are provided to generate cyclic pressure variations and coordinated flow reversals in the flow path. The cyclic volume displacement means each change the volume of a working space, which is part of the working volume and is connected to an end of the flow path or to a node in the flow path at the interconnection between adjacent adsorbent beds or absorbent bed segments. An intermediate node in the flow path or simply node is the term used in this disclosure for a junction in the flow path between adjacent absorbent beds or adjacent segments of an absorbent bed, at which a cyclic volume displacement means is connected to the flow path, or to which a feed supply means is connected to the flow path, or at which the flow path is branched. As illustrated in different embodiments described herein, the adjacent absorbent bed segments communicating through a node may equivalently either be separate absorbent beds, or may be segments of a single absorbent column with the nodes in that column representing the intermediate points along the column to which conduits removing or supplying gas mixture are connected to the flow path. The term absorbent bed as used in the specification and claims will thus apply equivalently to separate absorbent beds in a flow path, or to the absorbent bed segments of a single absorbent bed having intermediate nodes.

The volume displacement means associated with the working volume all reciprocate at the same frequency, but with a phase difference between at least two cyclic volume displacement means at opposite ends of the flow path. The working space of the volume displacement means at an end of the flow path which reciprocates with its volume changes in relatively leading phase will be referred to as the expansion space, and the working space of the volume displacement means at the opposite end of the flow path which reciprocates with its volume changes in relatively lagging phase will be referred to as the compression space. The volume variations of volume displacement means at intermediate nodes in the flow path may be in phase with either the compression or expansion space, or may have a phase intermediate between the compression and expansion spaces.

The feed gas mixture is introduced by feed supply means to an intermediate node in the flow path, and product streams concentrated in either of the respectively more readily and less readily adsorbed fractions are withdrawn by product delivery means connected to the opposite ends of the flow path. The more readily adsorbed or heavy component is concentrated in the heavy product withdrawn adjacent the compression space, and the less readily adsorbed or light component is concentrated in the light product withdrawn adjacent the expansion space.

Product delivery valves and valve control means are incorporated in the product delivery means, to control the mass flow rates of the heavy and light products so that desired high purity and recovery of the heavy and light components in respectively the heavy and light products is achieved. For combined high concentration and recovery of both components in the respective products, the mass flow ratio between light and heavy products should be approximately equal to the feed composition ratio of light and heavy components. For highest concentration and purity of either light or heavy component in the corresponding light or heavy product, the flow of that product relative to the other product will be reduced somewhat below the theoretical ratio indicated by the feed concentration ratio, thus enhancing the purity of one product at the cost of reducing both the recovery of that component and the purity of the other product.

The adsorbent beds and working spaces of volume displacement means along the flow path will be sized in approximate correspondence to the gas mixture composition and product flow ratio. In applications where the composition ratio of the light and heavy components of a binary mixture is of the rough order 1:1, only two adsorbent beds will typically be used on either side of the node to which the feed is introduced, and the adsorbent beds will typically be of similar cross-section end, and the compression and expansion spaces may have equal or roughly equal swept volume displacements. An intermediate variable volume working space at or adjacent the feed supply node may be of similar displacement to the compression and expansion spaces.

In applications where the feed composition ratio is greatly asymmetric, so that one of the heavy or light components is a minority component, and the other a majority component, the adsorbent bed and variable volume working space at the end of the flow path to which the minority component is concentrated will be much smaller than the adsorbent bed and working space at the end of the flow path to which the majority component is concentrated. Only one adsorbent bed will typically be used to concentrate and purify the majority component between the feed supply node and the product delivery end for the majority component. However multiple adsorbent beds, with intermediate variable volume working spaces at their interconnection nodes, may be used to achieve a large concentration ratio for a small minority component, with the adsorbent beds and intermediate working spaces being stepped down to smaller sizes in sequence from the feed supply node to the product delivery end for the minority component. As the minority component becomes more concentrated along the flow path, the adsorbent bed cross-section is stepped down with smaller variable volume working spaces also stepping down to the minority component product delivery end.

Thus, the adsorbent bed is tapered to be widest at the feed and majority product delivery ends, and smallest at the minority product delivery end. If the minority component is a smaller fraction of the feed, the ratios of adsorbent size and working space displacement from the minority product delivery end to the majority product delivery end become smaller, and more intermediate nodes become necessary or desirable to step down from the feed supply node to the minority product delivery end.

When the ratio of minority to majority components in a binary mixture is in the range of 1:10 to 1:100, the apparatus may incorporate two stepped adsorbent beds to concentrate the minority component, one adsorbent bed to purify the majority component, and four variable volume spaces at the ends and intermediate nodes of the flow path. When the ratio of minority to majority components becomes more extreme, i.e. of the order 1:1000, three or more stepped adsorbent beds may be needed to achieve a high final concentration of the minority component in the minority product.

An apparatus according to the invention for separating and concentrating the three components or fractions of a ternary gas mixture has a branched flow path, so that three flow path ends, each having an adsorbent bed and a variable volume space with a volume displacement means, are provided.

A first component which is either more or less readily adsorbed than the second and third components is introduced to the flow path at a point between the first end of the flow path to which the first product is concentrated, and the intermediate node from which the second and third flow paths branch and past which only the second and third components are allowed to pass for subsequent separation between the second and third flow path ends.

An independent aspect of the invention provides for energy balance between pairs of gas separators operating in opposed phase. In some embodiments, a balance is achieved between potential and kinetic energy storage by operating near the resonant natural frequency of the apparatus. In other embodiment, two pairs of opposed gas separators are operated with 90° phase difference, to approach potential energy balance between the four separators. Preferred embodiments use volume displacement means actuated by high or low pressure hydraulic drives.

A further independent and most important aspect of the invention is the use of layered adsorbent beds to achieve high flow uniformity transverse to the flow path, and to overcome limitations of packed pellet adsorbent beds including excessive attrition and pressure drop, and a fundamental inability to reach high cycle frequencies. The layered adsorbent bed, with defined geometric proportions, will enable radical improvement in higher operating cycle frequency and consequent miniaturization of the apparatus.

MODES FOR CARRYING OUT THE INVENTION

FIG. 1

Figure 1:
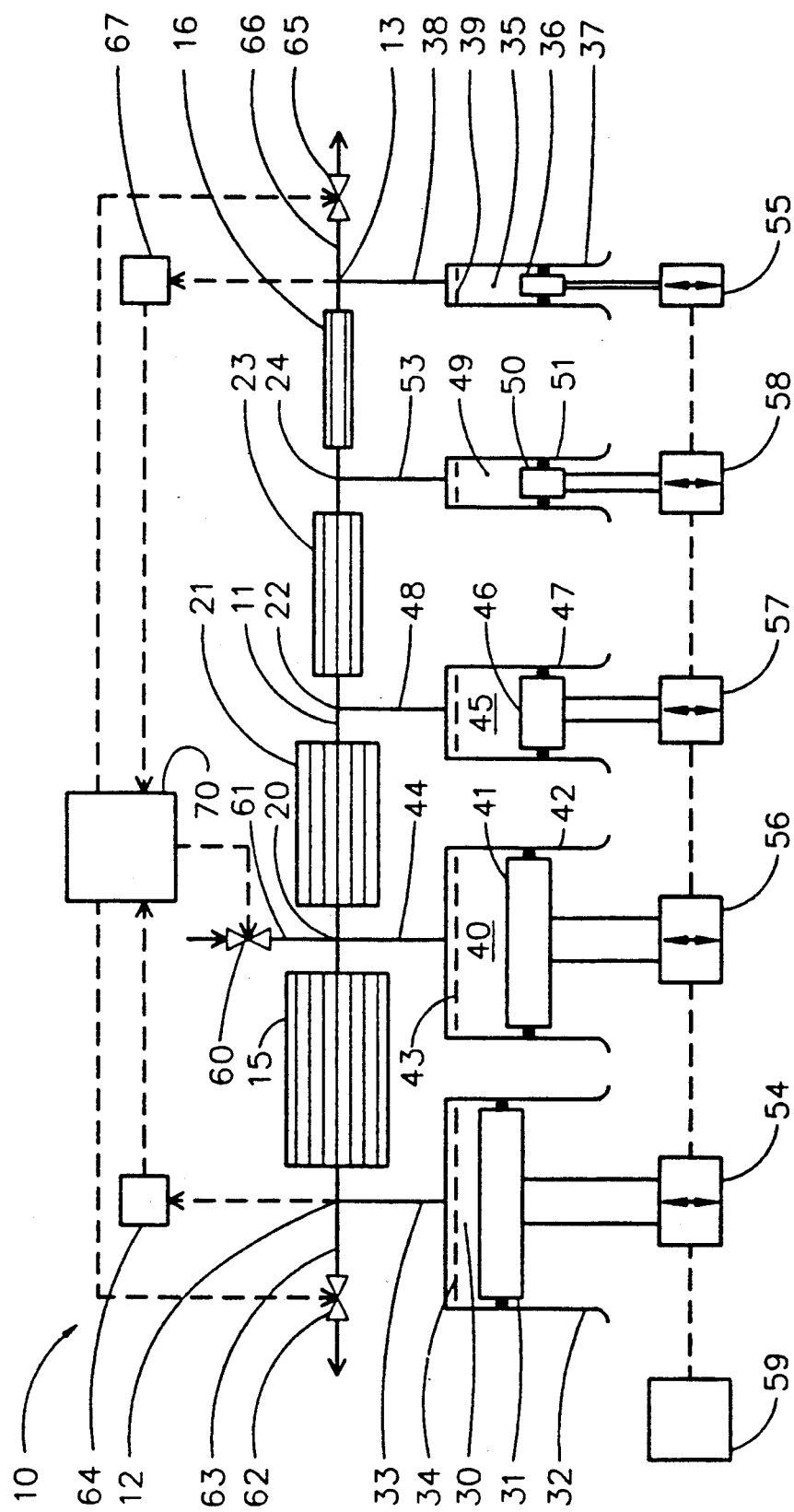
FIG. 1 is a simplified schematic of an apparatus with four adsorbent beds in a single flow path, for extracting and concentrating a trace component from a feed gas mixture.

A pressure swing adsorption apparatus 10 has a flow path 11 within the working space of the apparatus, the flow path having a first end 12 and a second end 13. The flow path passes through a number "N" of adsorbent beds or adsorbent bed segments in series, with intermediate nodes of the flow path between each adjacent pair of adsorbent beds. In the present invention, there are at least two adsorbent beds in the flow path; and in the particular embodiment of FIG. 1, N=4. The junctions in the flow path between adjacent adsorbent beds will be referred to as intermediate nodes of the flow path. The intermediate nodes are junctions where cyclically varied volumes communicate with the flow path, or where feed gas is introduced to the flow path, or where the flow path may be branched; and where the adsorbent bed cross-section may be stepped.

The adsorbent bed adjacent the first end 12 of the flow path will be referred to as the first adsorbent bed 15, while the adsorbent bed adjacent the second end 13 of the flow path is the second adsorbent bed 16. The first adsorbent bed 15 carries the flow path from its first end 12 to a first intermediate node 20, communicating with a first intermediate adsorbent bed 21 which carries the flow path to a second intermediate node 22, in turn communicating with a second intermediate adsorbent bed 23 which carries the flow path to a third intermediate node 24.

It will be understood that the flow path, in passing through an adsorbent bed, becomes in general a large number of substantially identical narrow channels in parallel, so that the gas mixture in the flow path is brought into intimate contact with the adsorbent material supported in the adsorbent bed, and with the entire flow path passing thus through the adsorbent bed so that there is substantially no bypassing of the flow path past an adsorbent bed. The adsorbent bed may be constituted as a packed bed of adsorbent pellets, or as a parallel channel monolithic structure. In either case, substantial geometrical similarity of the adsorbent bed channels is required to minimize axial dispersion and mixing in the flow path.

The adsorbent beds of the present invention may be separate adsorbent beds in distinct housings connected by conduits serving as the intermediate nodes, or may be segments of a single extended adsorbent column in a single housing. Each adsorbent bed (or adsorbent bed segment) is defined here to terminate at an intermediate node, regardless of whether the beds are physically separated or are segments of an extended adsorbent column having intermediate nodes. Thus, we will describe an adsorbent column having (N−1) intermediate nodes (for communication to variable volume spaces, feed introduction, or branching of the flow path) as a series of N adsorbent beds in a flow path. Multiple beds connected in parallel between the same nodes of the flow path are taken here as a single bed.

The working space of the apparatus includes a plurality of variable volume spaces communicating with the ends of the flow path and with some or all intermediate nodes of the flow path. The volumes of these spaces are cyclically changed at the same cyclic frequency by cyclic volume displacement means, coordinated to establish a phase relation between the spaces along the flow path. A first space 30 whose volume is changed by a first cyclic volume displacement means, provided as piston 31 reciprocating in cylinder 32, communicates with the first end 12 of the flow path by conduit 33. An optional flow distribution means, here provided as a flow distribution screen 34 at the entrance of conduit 33 into first space 30, serves to establish substantial transverse uniformity of flow in the first space with respect to movements of piston 31, so that flow entering the first space 30 from conduit 33 is stratified over piston 31 with minimal mixing, and thus the gas withdrawn from the first end of the flow path and stored in the first space over part of each cycle will return to the first end of the flow path from the first space with minimal disturbance of any concentration gradient that was in that gas along the flow path. By preserving the concentration gradient in the flow path with minimal mixing as that gas is carried into and out of the first space, the quality of the first product may be enhanced, and more effective purging of the first adsorbent bed 15 by the gas stored in the first space 30 will be achieved.

Figure 11:
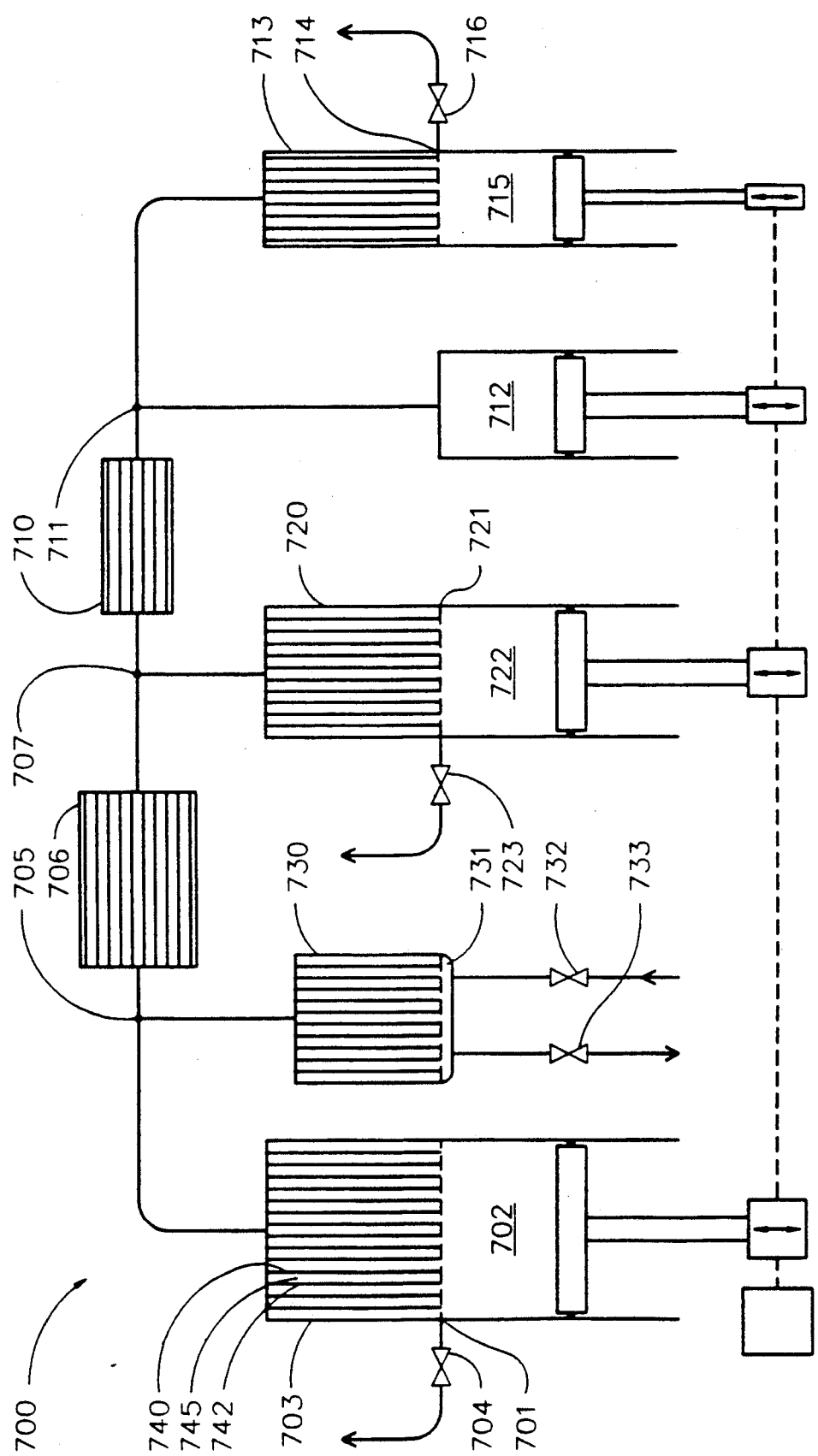
FIG. 11 shows an apparatus for separating the three components of a ternary gas mixture.

The flow distribution means may include configuring the cylinder 32 to have a small diameter and a long stroke, to reduce the opportunity for transverse mixing except in the cylinder wall boundary layer; or else subdividing piston 31 and cylinder 32 into a plurality of smaller cylinders or compartments in parallel, between which transverse mixing is prevented. If the cylinder and adsorbent bed diameters are designed to be equal, the adsorbent bed may be mounted coaxially at the entrance of the cylinder to provide uniform transverse flow distribution, as illustrated in FIG. 11 below.

Similarly, second space 35 whose volume is changed by a second volume displacement means provided as piston 36 reciprocating in cylinder 37 communicates with the second end 13 of the flow path by conduit 38, which enters the second space 35 through a flow distribution screen serving as optional flow distribution means 39. Again, the flow distribution means serves to preserve the concentration gradient in the flow path as gas flows into and back from the second space, thus enhancing the purity of the second product and the effectiveness by which gas stored in the second space 35 purges second adsorbent bed 16.

A first intermediate space 40 whose volume is changed by a first intermediate volume displacement means, provided as piston 41 reciprocating in cylinder 42, communicates through optional flow distribution means 43 and conduit 44 to first intermediate node 20 of the flow path. A second intermediate space 45, whose volume is changed by a second intermediate volume displacement means provided as piston 46 reciprocating in cylinder 47, communicates through an optional flow distribution means and conduit 48 to third intermediate node 22 of the flow path. A third intermediate space 49, whose volume is changed by a third intermediate volume displacement means provided as piston 50 reciprocating in cylinder 51, communicates through an optional flow distribution means 52 and conduit 53 to the third intermediate node 24 of the flow path.

In operation of the apparatus, gas mixture is withdrawn from an intermediate node of the flow path into an intermediate space which is expanding, and is subsequently returned to the same intermediate node of the flow path by contraction of that intermediate space. While the purpose of the apparatus is to establish a concentration gradient between first and second components along the flow path, detrimental mixing events at the intermediate nodes can occur, because of mixing both in the intermediate spaces of gas mixture which departed the flow path at varying concentration, and at the intermediate node of the gas mixture being returned to the flow path with gas mixture of a different concentration already in the flow path. Such mixing events will disturb the concentration gradient; but their effects can be minimized by use of flow distribution means in each intermediate space to minimize mixing, and by optimal phasing of the reciprocation of the pistons changing the volume of intermediate spaces so that gas returning to the flow path from an intermediate space will blend with gas mixture of substantially the same concentration already in the flow path.

Pistons 31, 36, 41, 46 and 50 are operated respectively by drive means 54, 55, 56, 57 and 58, Which are coordinated by a displacement control means 59, so as to change the total volume of the working space cyclically to change the working pressure between first and second pressures, and to generate flow in the flow path from its second end to its first end when the pressure is substantially the first pressure, and to generate flow in the flow path directed from its first end to its second end when the pressure is substantially the second pressure.

Each cyclic volume displacement means includes a cylinder containing a reciprocating piston, sealed by a piston seal means composed of a self-lubricating material such as PTFE, which may be coupled to its drive means by a piston rod and other connecting linkage as well known in the art. Reciprocating diaphragms or bellows could equivalently be used instead of pistons.

Apparatus 10 has a feed supply means including a feed supply valve 60 communicating by conduit 61 to the first intermediate node 20 of the flow path, for admitting a feed gas mixture containing first and second components to the working space. A first product enriched in the first component is withdrawn from the working space by a first product delivery means including a first product delivery valve 62 communicating by conduit 63 to the first end 12 of the flow path, and also including a first product composition sensor 64. A second product enriched in the second component is withdrawn from the working space by second product delivery means including second product delivery valve 65 communicating to the second end 13 of the flow path by conduit 66, and also including second product composition sensor 67. A valve control means 70 is provided to control the timing and flows of feed supply valve, and the first and second product delivery valves. In particular, valve control means 70 is responsive to the first product composition sensor 64 to adjust the flow through first product delivery valve 62, and is responsive to the second product composition sensor 67 to adjust the flow through second product delivery valve 65, so as to achieve high concentration and recovery of both the first component in the first product and the second component in the second product.

The apparatus 10 with four adsorbent beds is intended to separate feed mixtures in which the first component is a large majority component, and the second component is a small minority or even trace component. The first adsorbent bed 15 serves to purify the already highly concentrated first component into the first product, while three adsorbent beds 21, 23 and 16 in series are used to concentrate the initially dilute second component by a large concentration ratio into the second product.

For concentrating a trace second component to a high degree, the principle of the invention is to compound a series of successively smaller adsorbent beds in series, each adsorbent bed in sequence from the first intermediate node 20 to the second end 13 of the flow path multiplying the concentration of the second component to the next intermediate node, so that the final concentration ratio of the second component between the feed and second product is the product of the concentration ratios achieved by all the adsorbent beds between the feed injection point at the first intermediate node and the second end of the flow path.

Adsorbent beds 21, 23 and 16 are stepped downward to smaller cross-sections in that order, commensurate with the smaller total flows necessary in the flow path as the second component becomes more concentrated and the volume of first component diluting the gas mixture becomes smaller. The swept volumes of the spaces 45, 49 and 35 are sized in approximate correspondence with the steps in adsorbent bed cross-section at each intermediate node, so as to maintain approximately similar velocity amplitude and phase in each of the adsorbent beds. In effect, adsorbent beds 21, 23 and 16 provide the function of a single long adsorbent column concentrating the second component, with the stepping down of cross-section effectively tapering the overall column in correspondence to the ascending concentration of the minority component of the feed, and with variable volume spaces communicating with discrete intermediate nodes to maintain the correct coordination of flow with pressure despite the tapering of the column.

In operation of the apparatus 10, all variable volume spaces of the working space are cyclically changed at the same frequency, but the first space 30 and second space 35 will be changed with a phase relation such that the second space is expanding while the first space is contracting while the working pressure is substantially the second pressure, and the first space is expanding while the second space is contracting while the pressure is substantially the first pressure. The cyclic volume variations in the intermediate spaces may be in phase with those of the second space, or may be phased intermediately between the phases of volume variations in the first and second spaces. Preferably, the phase of spaces 30, 40, 45, 49 and 35 will change monotonically between the first and second ends of the flow path, so that the phase relation between working pressure (or selective adsorption and desorption responding to pressure changes) and the reversing flow in the flow path will be similar in all adsorbent beds, thus using the intermediate spaces to compensate undesirable phase shifts due to compressibility effects in the long total adsorbent column between first and second ends of the flow path.

In most applications for extraction of a small minority or trace component from a majority or carrier component, the minority second component is more readily adsorbed than the majority first component. Then, volume changes in the first space will have a leading phase with respect to volume changes in the intermediate spaces and the second space, so that flow in the flow path is directed toward its first end when the working pressure is the first pressure which is higher in this case than the second pressure.

FIG. 2

An apparatus 80 is similar to embodiment 10, but has N=2 adsorbent beds. For brevity, component nomenclature and numerals are identical to FIG. 1, except as noted below. With reference to FIG. 1, the first and second intermediate adsorbent beds 21 and 23, second and third intermediate nodes 22 and 24, and second and third intermediate spaces 41 and 42 with associated volume displacement means have been deleted in the embodiment 80. Thus, the flow path in embodiment 80 proceeds from its first end 12 through first adsorbent bed 15 to the first and only intermediate node 20, and thence directly through the second adsorbent bed 16 to the second end of the flow path 13.

Figure 2:
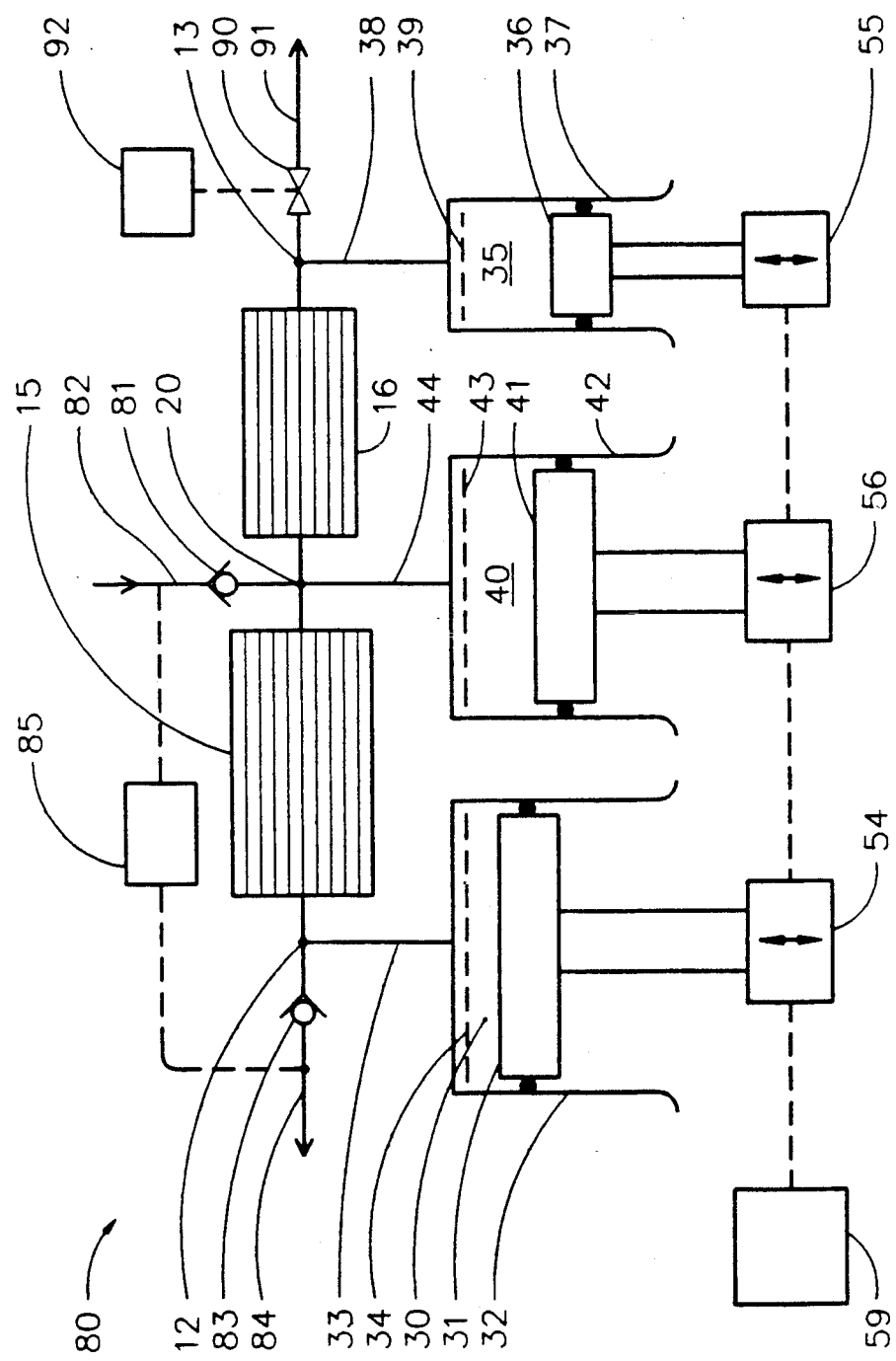
FIG. 2 shows a similar apparatus with two adsorbent beds.

Some particular configurations of the feed supply means, and of the product delivery means are depicted in FIG. 2. These configurations are preferred in the case that the first component is less readily adsorbed than the second component, so that the first pressure is higher than the second pressure; and while shown here for the example of N=2, may be used with embodiments having any value of N.

In embodiment 80, the feed supply means includes non-return valve 81 communicating into intermediate node 20 as feed supply valve drawing feed from feed conduit 82, and also includes means not shown for establishing a feed pressure substantially equal to the second pressure in conduit 82. The first product delivery means includes non-return valve 83 communicating from the first end of the flow path 12 as first product delivery valve delivering the first product to delivery conduit 84, and also includes means not shown for maintaining a first product delivered pressure in conduit 84 substantially equal to the first pressure. Feed valve 81 will thus open to introduce feed to the first intermediate node when the working pressure is the lower second pressure, and first product delivery valve 83 will open when the working pressure is the higher first pressure to deliver the first product compressed by apparatus 80. Flow control means 85 cooperating with conduits 82 and 84 will establish a relationship between the feed flow and the first product flow, most directly by adjusting the first and second pressure established in those conduits. When the working pressure ratio between the absolute first and second pressures is relatively small, feed flow and first product flow will be increased. As the pressure ratio established between feed conduit 82 and first product delivery conduit 84 is increased up to a maximum limit above which first product flow cannot be delivered, the first product flow is then reduced.

The second product delivery valve is here shown as a two-way valve 90 communicating between the second end 13 of the flow path and second product delivery conduit 91, and controlled by valve control means 92 so as to establish the second product delivery rate commensurate with the feed and first product flows, such that the first and second products each attain desired purity and recovery.

With the first component less readily adsorbed than the second component, volume changes in the first space will have a leading phase with respect to volume changes in the second space, and the pressure will oscillate with a phase of maximum (minimum) pressure intermediate between the minimum (maximum) volume phases of the first and second spaces. Preferably, the phase of volume changes in the intermediate space 40 will likewise be intermediate between the phase of volume changes in the first and second spaces, and substantially in opposite phase to pressure changes, so that the concentration of gas mixture that has entered intermediate space 40 through flow distribution means 43 and is returning to intermediate node 20 will have substantially the same concentration as gas mixture already in the flow path at intermediate node 20.

FIG. 3

An apparatus 100 has four adsorbent beds along a single flow path as in the embodiment of FIG. 1, but is simplified mechanically by providing the second space and the intermediate spaces as chambers of a stepped piston. The flow path has a first end 102 and a second end 103, communicating respectively with first product delivery valve 104 and second product delivery valve 105. The first end 102 of the flow path communicates by conduit 106 to first space 107, and the second end of the flow path 103 communicates by conduit 108 to second space 109.

From its first end 102, the flow path passes through first adsorbent bed 110 to first intermediate node 111 to which the feed supply valve 112 communicates by conduit 113. From intermediate node 111, the flow path passes directly through the first intermediate space 115, which thus may be regarded as an extension of the first intermediate node, through conduit 116 to the first intermediate adsorbent bed 117. Through adsorbent bed 117, the flow path continues to second intermediate node 118, thence through second intermediate adsorbent bed 120 to third intermediate node 121 and thence through second adsorbent bed 122 to the second end 103 of the flow path.

The second and third intermediate nodes 118 and 121 may coincide with baffles for flow redistribution, as the adsorbent column cross-section is stepped at these nodes. The second intermediate node 118 is connected by conduit 125 to second intermediate space 126, and the third intermediate node is connected by conduit 127 to third intermediate space 128.

The volume of the first space 107 is cyclically changed by a first volume displacement means 130, including piston 131 reciprocating in cylinder 132. First drive means 133 is coupled to piston 131 by piston rod 134. The volume of the second space 109, third intermediate space 128, second intermediate space 126, and first intermediate space 115 are cyclically changed in the same phase and with the same stroke by stepped piston 140 reciprocating within stepped cylinder 141, stepped piston having piston seals 145, 146, 147 and 148 to seal cylinder sections of successively smaller diameter within stepped cylinder 141.

Thus, cross-sectional areas are defined, of the second space 109 by the sealing area of seal 145, of the third intermediate space 128 by the annular area between seals 145 and 146, of the second intermediate space 126 by the annular area between seals 146 and 147, and of the first intermediate space 115 by the annular area between seals 147 and 148. Stepped piston 140 is driven by second drive means 150 through piston rod 151. Drive means 150 and 133 cooperate to establish a phase relation between volume changes in the first and second spaces, such that volume changes in the first space lead volume changes in the second space when the second component is more readily adsorbed than the first component.

Figure 3:
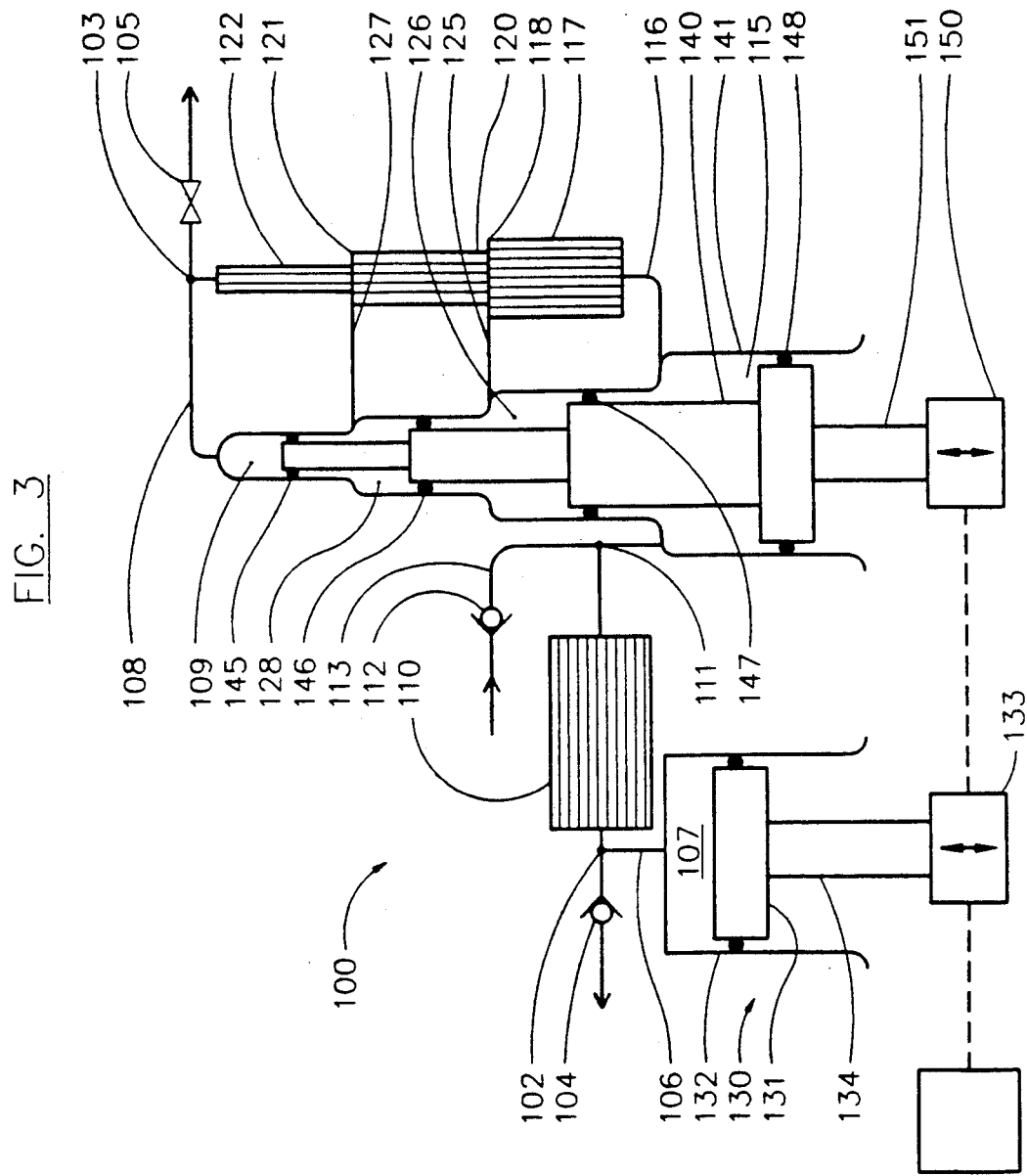
FIG. 3 shows an apparatus with four adsorbent beds, using a stepped piston for mechanical simplicity.
Figure 4:
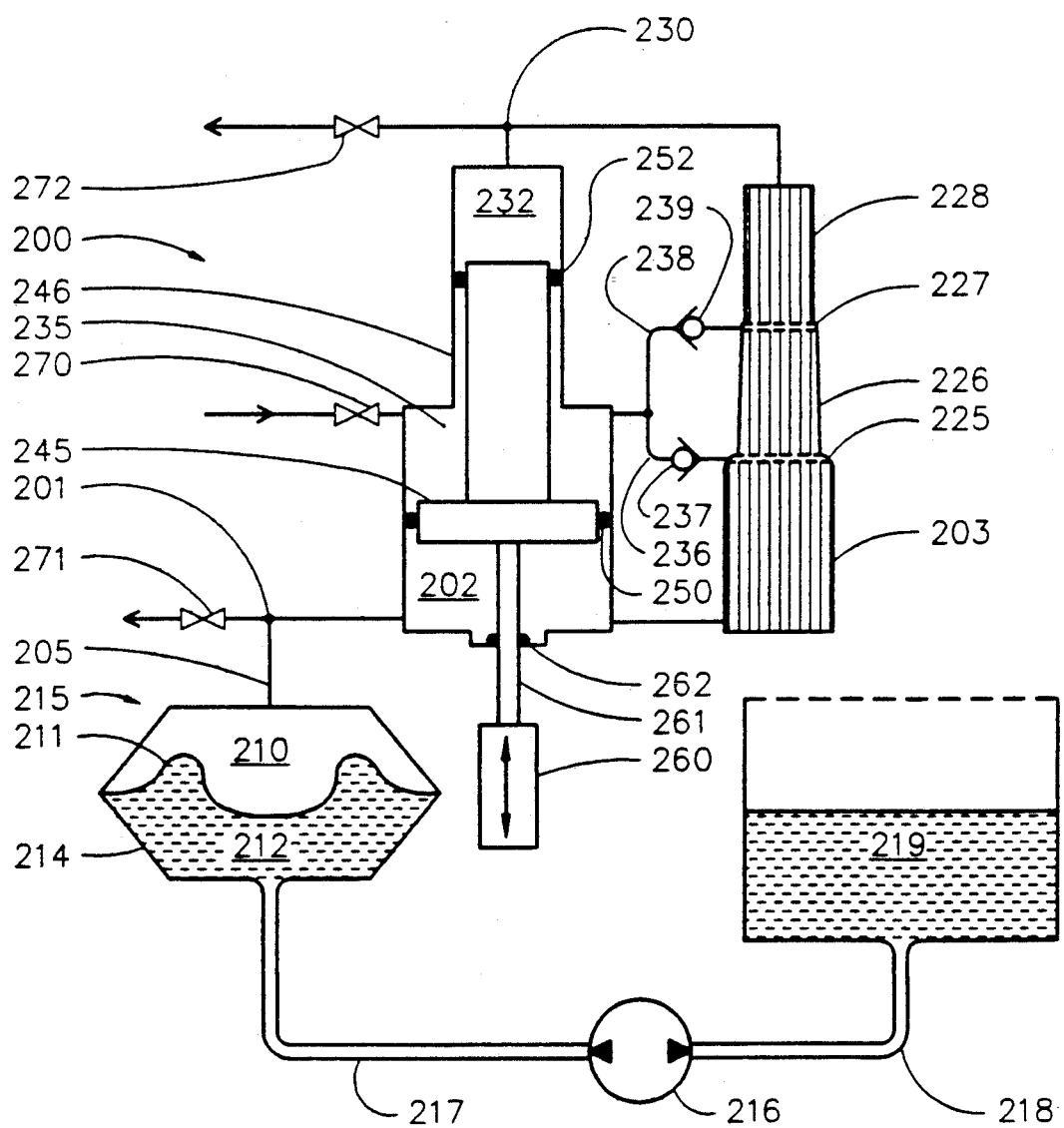
FIG. 4 shows an apparatus with three adsorbent beds, a displacer piston for generating flow reversals, and a hydraulically displaced diaphragm for generating pressure changes.

Referring to FIG. 3, variable volume second intermediate space 126 communicates by conduit 125 to intermediate node 118 of the flow path between adsorbent beds 117 and 120. With the second component more readily adsorbed than the first component, the first pressure is higher than the second pressure. Volume changes in second space 109 and in second intermediate space 126 (which are in phase because of the stepped piston configuration) lag volume changes in first space 107. Thus, space 126 expands when the working pressure is relatively low, and contracts when the working pressure is relatively high. The gas mixture contacting the adsorbent beds is relatively enriched in the second component when the pressure is low, and relatively depleted in the second component when the pressure is elevated. Thus, gas mixture flowing into space 126 will be relatively enriched in the second component owing to the typically lower pressure, while this gas will be returned to intermediate node 118 during an interval of higher pressure when the gas in the flow path then flowing from adsorbent bed 120 to bed 117 will be less concentrated in the second component during much of this interval. Thus, some undesirable mixing of relatively enriched gas from space 126 into less enriched gas already in the flow path at node 118 will occur in this embodiment. Similarly, mixing will occur in the first intermediate space 115, through which the flow path passes between adsorbent beds 110 and 117. FIG. 4 will illustrate an alternative approach for compensating such mixing effects.

EXAMPLE NO. 1

An application for this invention of potential future importance is the extraction and concentration of trace levels of hydrogen isotopes including tritium from helium. The tritium would be generated in the lithium blanket surrounding a fusion reactor, and flushed from this blanket by a helium purge stream. The tritium must be extracted from the helium, concentrated and purified before use as reactor fuel.

An experimental apparatus as depicted in FIG. 1 and in the specific arrangement of FIG. 3 was assembled with adjustable phase between the first and second spaces, and with the intermediate spaces all reciprocating in phase with the second space. Pistons sealed by spring-loaded PTFE cup seals were used as the cyclic volume displacement means. With typical operating piston strokes, the swept volumes of the spaces were 300 cc for the first space, 130 cc for the first intermediate space, 97 cc for the second intermediate space, 47 cc for the third intermediate space, and 30 cc for the second space. Adsorbent bed volumes were 59.7 cc for the first adsorbent bed, 41.5 cc for the first intermediate adsorbent bed, 26.5 cc for the second intermediate adsorbent bed, and 14.9 cc for the second adsorbent bed.

The apparatus was operated With all adsorbent beds cooled by dry ice to a working temperature of about 195 K, at which hydrogen is much more readily adsorbed than helium over common adsorbents. Activated charcoal adsorbent was used. The working pressure cycled between the feed pressure of approximately 1.5 atm absolute and the helium product delivery pressure of approximately 3.5 atm absolute, at an experimental operating cycle frequency of 5 cycles/min. The phase of volume changes in the second space was typically 90° leading volume changes in the first space.

The feed gas mixture was helium containing 0.1% ordinary hydrogen, supplied at a fixed nominal flow of 330 cc/min. The ratio of first and second product flows was controlled by timing of solenoid valves serving as product delivery valves, and by adjusting a needle valve as part of the second product delivery means to control the second product flow rate directly. After the apparatus was started with clean adsorbent beds, it was found that pure helium could be delivered immediately as the first product, but that several hours of operation were necessary to accumulate sufficient hydrogen in the adsorbent beds and spaces between the first intermediate node and the second end of the flow path, before a concentrated hydrogen product could be delivered as the second product. The time required to charge the apparatus with hydrogen was reduced by operating during this period with no second product delivery flow. However, some second product delivery flow was desirable when the apparatus needed to be purged of any residual air.

Once the apparatus was charged with hydrogen reaching a desired concentration in the second space, it was found that the second product could be withdrawn and stable conditions established by suitable adjustment of the product delivery valves. Hydrogen concentration of 75% was obtained from the 0.1% feed, when the flow ratio of second product to first product flow was 0.001, equal to the feed concentration ratio of second to first component. Since hydrogen recovery was 75%, by mass balance the helium stream was incompletely purified although the trace hydrogen was not detectable in the gas chromatograph. When the ratio of second product to first product was increased to 0.003, or three times the feed concentration ratio of second to first component, hydrogen purity in the second product was measured at 34%, indicating 100% recovery and by mass balance complete purification of the helium first product.

EXAMPLE NO. 2

Methanol may be used as an indirect fuel for fuel cells, by steam reforming the methanol over a copper/zinc catalyst to generate, an approximately 3:1 gas mixture of $H_2$ and CO.

An apparatus as shown in FIG. 2 was operated at ambient temperature, with the cyclic volume changes in the first space leading those of the second space by 45°, and with volume changes in the intermediate space in phase with those of the second space. Each of the first, second and intermediate spaces had a swept volume of approximately 200 cc. Activated charcoal was used as adsorbent in both first and second adsorbent beds. A dry gas mixture (representing methanol reformate) of 74% hydrogen, 24.5% carbon dioxide, 1% carbon monoxide and 0.5% methane was fed to the apparatus at a rate of approximately 250 cc/min. Cycle frequency was 10 RPM. Hydrogen purity was measured by a gas chromatograph with thermal conductivity and flame ionization detectors. The hydrogen in the first product was delivered at >99.9% purity (with no detectable impurities) up to 98.7% recovery of feed hydrogen in the first product, by controlling the second product flow relative to feed flow so that the ratio of the first product flow to the second product flow was about 73%.

In the present application, hydrogen is the less strongly adsorbed first component, and the three carbon compound impurities are separated together as the more strongly adsorbed second fraction here defined as the "second component" so that the methanol reformate feed gas mixture is for the purposes of this invention considered as a binary mixture of hydrogen and the impurities lumped as the second component. Thus, the first product containing pure first component was obtained with nearly complete recovery of the first component by controlling the ratio of first and second product flows to be slightly less than the feed concentration ratio of first and second components in the binary feed gas mixture. By operating with the ratio of first and second product flows somewhat more than the feed concentration ratio, the first product becomes less pure, while the second product can be "purified" to contain only second component and no first component hydrogen. By operating in the ideal case that the ratio of product flows is exactly equal to the feed concentration ratio, high purity and recovery of both products will be achieved, but with less perfect purification of each product than could be achieved by operating at a product flow ratio corresponding to less than 100% recovery of the product to be most highly purified.

FIG. 4

An embodiment 200 of the invention is shown with N =3 adsorbent beds, and with the working space of the apparatus arranged so that substantially all volume changes are achieved in a single cyclic volume displacement means, while the reversing flow pattern in the flow path is largely generated and controlled by a displacer piston means whose operation does not make more than a small net contribution to the cyclic changes of the total working volume. The adsorbent bed configuration of embodiment 200 is arranged for the case that the first component is less readily adsorbed than the second component, so that the first pressure is higher than the second pressure.

Gas separation apparatus 200 has a first end of the flow path 201 communicating through a first displacer chamber 202 with first adsorbent bed 203. First end 201 of the flow path also communicates by conduit 205 to variable volume space 210, whose volume is changed by diaphragm 211 separating the gas in space 210 from displacement liquid in volume displacement chamber 212. Variable volume space 210 and volume displacement space 212 separated by diaphragm 211 are enclosed by diaphragm housing 214, and together constitute a hydraulic volume displacement means 215 which is primarily responsible for cyclic volume changes of the working space. The volume of displacement liquid in chamber 21 is cyclically varied by reversing pump 216 communicating by liquid conduit 217 with chamber 212. Pump 216 connects liquid conduit 217 with liquid conduit 218 communicatinq to liquid reservoir, and is means for oscillating the liquid volume in chamber 212 and thus for cyclically displacing diaphragm 211 to change the volume of the working space and thus to change the working pressure in the flow path. Thus pump 216 with the displacement liquid in volume displacement chamber 212 are means to change the volume of the working space and the working pressure in the flow path by liquid displacement; while diaphragm 211 is means to transfer volume displacement and pressure changes between the displacement liquid and the working space, and to substantially prevent direct contact between the displacement liquid and the gas in the working space. Pump 216 is also a means for energy transfers to and from the apparatus. To reduce the peak power transfers in pump 216, it is desirable that reservoir 219 be pressurized to approximately the average working pressure between the first and second pressures in the working volume. Further means for reducing power requirements are provided in FIGS. 5 and 6 below.

The flow path continues from its first end 201 through first adsorbent bed 203 to first intermediate node 225, communicating with intermediate adsorbent bed 226. The flow path continues through intermediate adsorbent bed 226 to second intermediate node 227, communicating with second adsorbent bed 228. The second adsorbent bed 228 communicates with the second end of the flow path 230 and the second space 232.

A feature of the invention, which may also be applied to other embodiments with N>3, is now described as an alternative for partially compensating mixing effects that would result from removing gas mixture from an intermediate node to an intermediate space at a higher concentration in the more readily adsorbed component reflecting the then lower working pressure, and then returning that gas mixture back to the same intermediate node when the pressure is higher and the concentration in the flow path contacting the adsorbent beds is thus lower. Since the first component is here less readily adsorbed than the second component, volume changes in the second space have a lagging phase with respect to volume changes in the first space. The apparatus has an intermediate space 235 whose volume changes are in phase with volume changes in second space 232. First intermediate node 225 is connected to intermediate space 235 by conduit 236 including first non-return valve 237, which permits flow directed from node 225 to space 235 but prevents reverse flow from space 235 to node 225. Intermediate space 235 is connected to second intermediate node 227 by conduit 238 including second non-return valve 239, which permits flow directed from space 235 to node 227 but prevents reverse flow from node 227 to space 235. Intermediate space 235 will be expanding in phase with second space 232 when the working pressure is relatively low, so gas mixture then entering space 235 through first non-return valve 237 is relatively enriched in the second component. Later in the cycle, intermediate space 235 will be contracting in phase with the second space 232 when the pressure is relatively high, so that gas contacting the adsorbent is relatively depleted in the more readily adsorbed second component, and the gas mixture from space 235 is then returned through second non-return valve 239 to the flow path at second intermediate node 227. Since the second intermediate node is closer to the second end of the flow path than the first intermediate node, the concentration of the second component will be higher at the second node 227 than at the first node 225. Thus, the average concentration of the gas entering second intermediate node 227 from non-return valve 239 will be approximately the same as the gas already in the flow path at the second node 227, provided that the length of adsorbent bed 226 between nodes 225 and 227 is chosen so that the concentration difference due to the pressure change is approximately compensated and cancelled by that due to the shift between nodes 225 and 227. The first and second non-return valves and associated conduits are means to shift the point at which gas mixture from an intermediate space is injected into the flow path, from the point at which the gas mixture was removed from the flow path into the intermediate space, so as to compensate concentration changes due to changes of working pressure.

In embodiment 200, the second space 232 and intermediate space 235 are defined and cyclically varied in the same phase by a stepped displacer piston 245 reciprocating in stepped displacer cylinder 246. The volumes of these spaces are established by the stroke of the displacer piston and the sealing diameters defined by seal 250 separating spaces 202 and 235, and seal 252 separating spaces 235 and 232. Displacer piston 245 is reciprocated by displacer drive means 260, connected by displacer piston rod 261 which is sealed by rod seal 262. Displacer piston rod diameter is preferably small, so that the net change of the working volume by actuation of the displacer piston is minor relative to the changes of the working volume by diaphragm 211. It is desirable that flow friction pressure drop in the adsorbent beds and along the flow path be small, and that the displacer piston itself have low inertia and friction. Then the power required to reciprocate the displacer piston 245 will be small compared to the power associated with movements of diaphragm 211.

The swept volume of space 202 is equal (apart from a correction for the small differential displacement effect of piston rod 261) to the swept volume sum of spaces 235 and 232, but is varied in opposite phase. The first space of apparatus 200 is the sum of spaces 202 and 210. Pump 216 and displacer piston drive means 260 are operated to reverse at the same frequency, and at a relative phase such that the phase of volume changes between second space 232 and first space (202 plus 210) is about 90° or other desired angle. As before, volume changes in the first space will lead volume changes in the second space if the first component is less readily adsorbed than the second component, and vice versa since the pressure is relatively increased when the gas is flowing in a first direction in the flow path then toward the first space and is relatively decreased when the gas is flowing in the reverse direction in the flow path then toward the second space.

The feed supply valve 270 communicates with the first intermediate node 225, while the first product delivery valve 271 withdraws the first product from the first end of the flow path 201 and the second product delivery valve 272 withdraws the second product from the second end 230 of the flow path.

The principle of performing substantially all the volume changes of the working space in a single chamber, here using a liquid displaced diaphragm, while using displacer piston means to establish and coordinate reversing flow in the flow path, may be expressed in numerous other configurations. More general phase relations between volume changes in spaces along the flow path may be achieved by providing multiple displacer pistons generating opposed volume displacements between pairs of intermediate nodes along the flow path. Thus, a displacer piston is means to generate cyclic reversing flow through adsorbent beds in the flow path, by cyclically generating opposed and approximately equal volume displacements at separate ends or intermediate nodes of the flow path to which the opposite sides of the displacer piston communicate; and to control the reversing flow pattern in the flow path so as to establish a relative phase between the gas flow in the flow path and the pressure changes in the working space. The chamber in which the major volume changes of the working space are performed could be connected to an intermediate node rather than an end of the flow path.

It may be noted that the working space of the apparatus 200, including all adsorbent beds, spaces and conduits along the flow path, has its volume changed primarily by liquid displacements from pump 216. When the volume of liquid in chamber 212 is maximized and the volume of the working space thus minimized, the working pressure of the working space and of the liquid in chamber 212 will be maximized, and vice versa. Thus, the working space functions as a first gas spring communicating by liquid conduit 217 to pump 216. If the gas space over reservoir 219 is enclosed, it will also function as a second gas spring, whose pressure will respond to liquid volume transfers by pump 216 in opposite phase to the first gas spring.

It will be noted that the hydraulic volume displacement means 215 is means to transfer volume displacements and pressure changes between the displacement liquid and the gas in the working space of the gas separation apparatus, while preventing direct contact between the displacement liquid and the gas. If diaphragm 211 is highly flexible, the working pressure of the gas in space 210 will be substantially the same as the pressure of the liquid in chamber 212. Diaphragm 211 may be fabricated of elastomeric or metallic material, according to the working temperature and the degree of hermetic sealing required between gas and liquid.

FIG. 5

An alternative hydraulic volume displacement means 290 may be substituted for hydraulic volume displacement means 215 in embodiment 200 of FIG. 4. Here, the volume of space 210 communicating by conduit 205 to the first end of the flow path is varied by a gas piston 291, slidably sealed by seal 292 in cylinder 293. Gas piston 291 is reciprocated by hydraulic piston 295, slidably sealed by seal 296 in cylinder 297. If the area of hydraulic piston 295 is smaller than the area of gas piston 291, the working pressure of the liquid will be amplified and the flow of the liquid relative to the volumetric gas flow will be reduced by a corresponding ratio.

Piston rod 298 connects gas piston 291 to hydraulic piston 296, and is means to transmit force between these pistons and to coordinate their motion. Piston rod 298 may be elongated to minimize risk of contamination by the liquid in the working volume. If hermetic sealing of the working volume is required, as for separation of radioactive gases such as tritium, a linear permanent magnet coupling may be equivalently used to transmit force and position coordination between portions of piston 291 and 212, across a cylinder wall separating portions of space 210 and chamber 212.

FIG. 6

Figure 6:
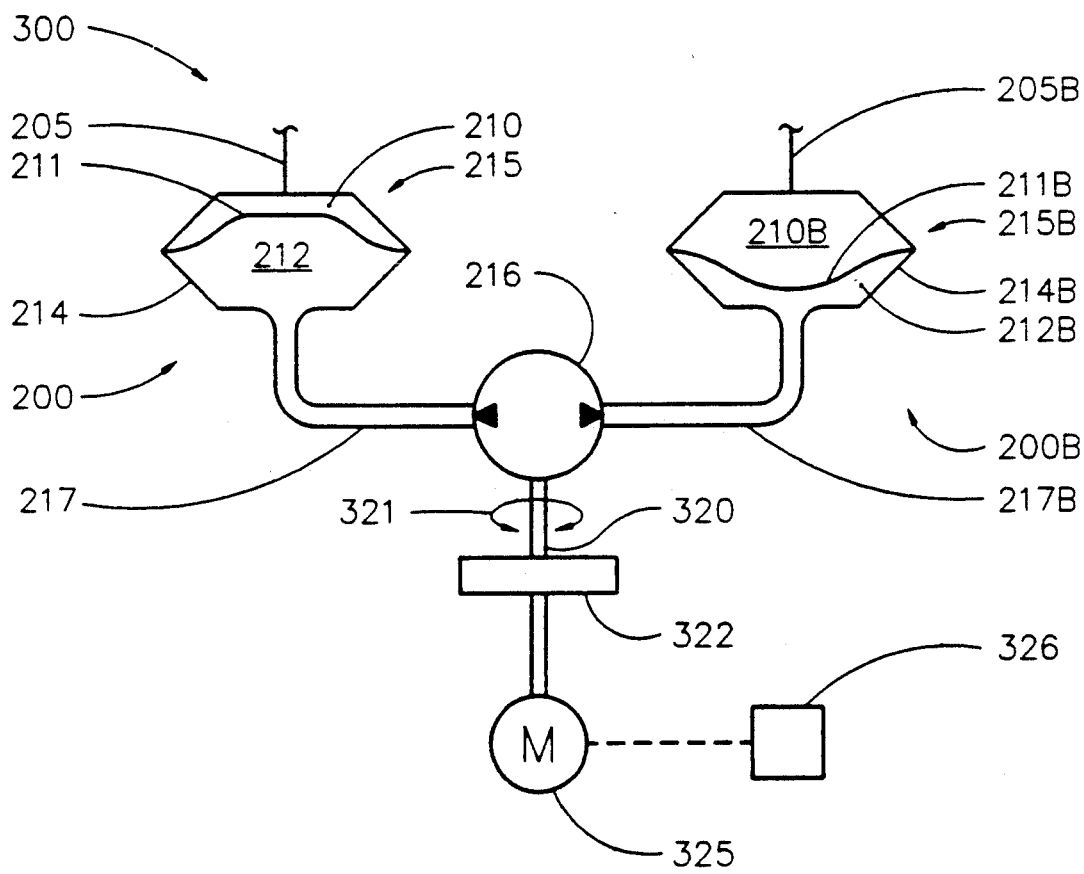
FIG. 6 shows means for achieving balance of potential and kinetic energy between two opposed hydraulic volume displacement means.

Pump apparatus 300 enables efficient energy exchanges and balance between a first gas separation apparatus 200 as shown and described in FIG. 4, and a second identical gas separation apparatus 200B operating in opposite phase. FIG. 6 shows the volume displacement means 215 communicating by conduit 205 to the working space (not shown) of first gas separation apparatus 200, and by liquid conduit 217 to pump 216. Symmetrically, pump 216 communicates by conduit 217B (replacing conduit 218 of FIG. 4) to volume displacement means 215B (replacing reservoir 219). Volume displacement means 215B has a liquid displacement chamber 212B communicating with liquid conduit 217B, and separated by diaphragm 211B in housing 214B from variable volume space 210B communicating by conduit 205B to the first end of the flow path in the working space (not shown) of the second gas separation apparatus 200B.

It will be seen that the liquid displacement chambers 212 and 212B each serve as a liquid reservoir for the opposite gas separation apparatus 200B or 200, and that each gas separation apparatus 200 and 200B operating under similar conditions appears as a gas spring of equal stiffness and coupled oppositely to pump 216. Potential energy (including energy of compression and adsorption) of the combined apparatus is maximized when the working pressures of the two working spaces are oppositely extremized, when the volume of liquid in chamber 212 or 212B is maximized and the volume of liquid in the opposite chamber 212B or 212 is minimized. Potential energy of the combined apparatus is minimized when the working pressures of the two working spaces are equal as the volume of liquid in chambers 212 and 212B are also equal.

When the potential energy of the combined apparatus is maximized, flow in conduits 217 and 217B is approximately zero as pump 216 is reversing. When the potential energy of the combined apparatus is minimized, flow in conduits 217 and 217B will be substantially maximized as pump 216 is then transferring liquid between chambers 212 and 212B. Kinetic energy associated with the liquid flow in conduits 217 and 217B, and between chambers 212 and 212B is thus maximized as the potential energy is minimized, while that kinetic energy becomes zero as the potential energy is maximized. Thus, the changes in kinetic energy tend to cancel the changes in potential energy. Ideally, the total energy associated with operation of the cyclic volume displacement means 215 and 215B, comprising the sum of potential and kinetic energy contributions, will be maintained nearly constant through cancellation of potential and kinetic energy variations, thus achieving balance between energy stored alternatingly in kinetic and potential energy forms, and minimizing the peak and average power demand of pump 216. When the amplitude of variations in kinetic and potential energy are equal, the combined apparatus is operating at its natural resonant frequency.

The kinetic energy associated with liquid flow between chambers 212 and 212B is the sum of the kinetic energies of all moving liquid particles, i.e. the mass of the particle times the square of its velocity and divided by 2. Thus, relatively small volumes of liquid moving at high velocity can make a large contribution to kinetic energy. Hence, smaller diameters and longer length of conduits 217 and 217B, commensurate with good hydraulic design to avoid large flow friction losses, will enhance the kinetic energy storage capacity of apparatus 300. Use of higher density liquid and operation at higher cycle frequency will also enhance kinetic energy storage within a compact overall volume.

Means are thus provided to balance internal energy storage to be approximately constant, so as to minimize peak power requirements. Means to balance internal energy storage to be approximately constant is provided by inertial coupling means to determine the amplitude of variation of kinetic energy within the apparatus at the cyclic frequency, including the kinetic energy contribution of flowing displacement liquid, to be approximately equal to the amplitude of variation of potential energy within the apparatus, including energy of compression.

To further enhance the kinetic energy storage in apparatus 300, it is desirable to supplement the direct inertia of the moving liquid with additional inertia coupled in through pump 216 and its drive. For this purpose, pump 216 may be selected as a high speed fixed pitch propeller pump, or as a fixed displacement positive displacement pump such as a screw, vane or gear pump. A propeller pump would be preferred for low pressure applications; while a positive displacement pump would be preferred when the displacement liquid pressures are relatively high, as when using the piston hydraulic displacement means 290 of FIG. 5. The pump will be selected to be bidirectional in flow and shaft rotation. Apart from slip due to pressure loading across the pump, pump shaft speed is then approximately proportional to liquid flow. The pump shaft 320 is bidirectional as indicated by arrow 321. Shaft 320 is coupled to flywheel 322 and variable speed bidirectional motor 325, which is controlled by motor speed controller 326. Controller 326 causes the motor to reverse its direction of rotation at the cyclic frequency of the gas separation apparatus, and to turn the pump enough revolutions in each direction of rotation to transfer the required liquid volume between chambers 212 and 212B. For high efficiency and positive control, motor 325 may be a switched reluctance electric motor or stepper motor. Controller 326 will cooperate with the displacer drive means of each gas separation apparatus to establish desired phase angles between volume changes in each flow path.

Kinetic energy storage in apparatus 300 is now provided by the moving liquid, as well as the moving rotor of pump 216, shaft 320, flywheel 322 and motor 325. Although the potential energy associated with working pressure changes in the working spaces may be large, apparatus 300 permits the practicable storage of similarly large kinetic energy to achieve overall energy balance, particularly when the cycle frequency of the apparatus is 50 RPM or greater.

FIG. 7

Pump apparatus 400 displays another approach to load balancing between multiple gas separation apparatus based on embodiment 200 of FIG. 4, with hydraulic diaphragm or piston volume displacement means for changing the working space volume. Four gas separation apparatus have the first ends of their flow paths communicating by conduits 205C, 205D, 205E and 205F to the variable volume spaces 210C, 210D, 210E and 210F of hydraulic volume displacement means 215C, 215D, 215E and 215F with the gas separated from the displacement liquid by diaphragms 211C, 211D, 211E and 211F in housings 214C, 214D, 214E and 214F respectively. Pump 401 exchanges fluid between conduit 217C communicating to liquid displacement chamber 212C and conduit 217D Communicating to liquid displacement chamber 212D. Pump 401 is driven at substantially constant speed by motor 403 through shaft 404. Thus, the four cooperating gas separation apparatus are each similar to embodiment 200; and are identified as a first gas separation apparatus associated with hydraulic volume displacement means 215C, a second apparatus with hydraulic volume displacement means 215D, a third apparatus with hydraulic volume displacement means 215E, and a fourth apparatus with hydraulic volume displacement means 215 F.

Figure 5:
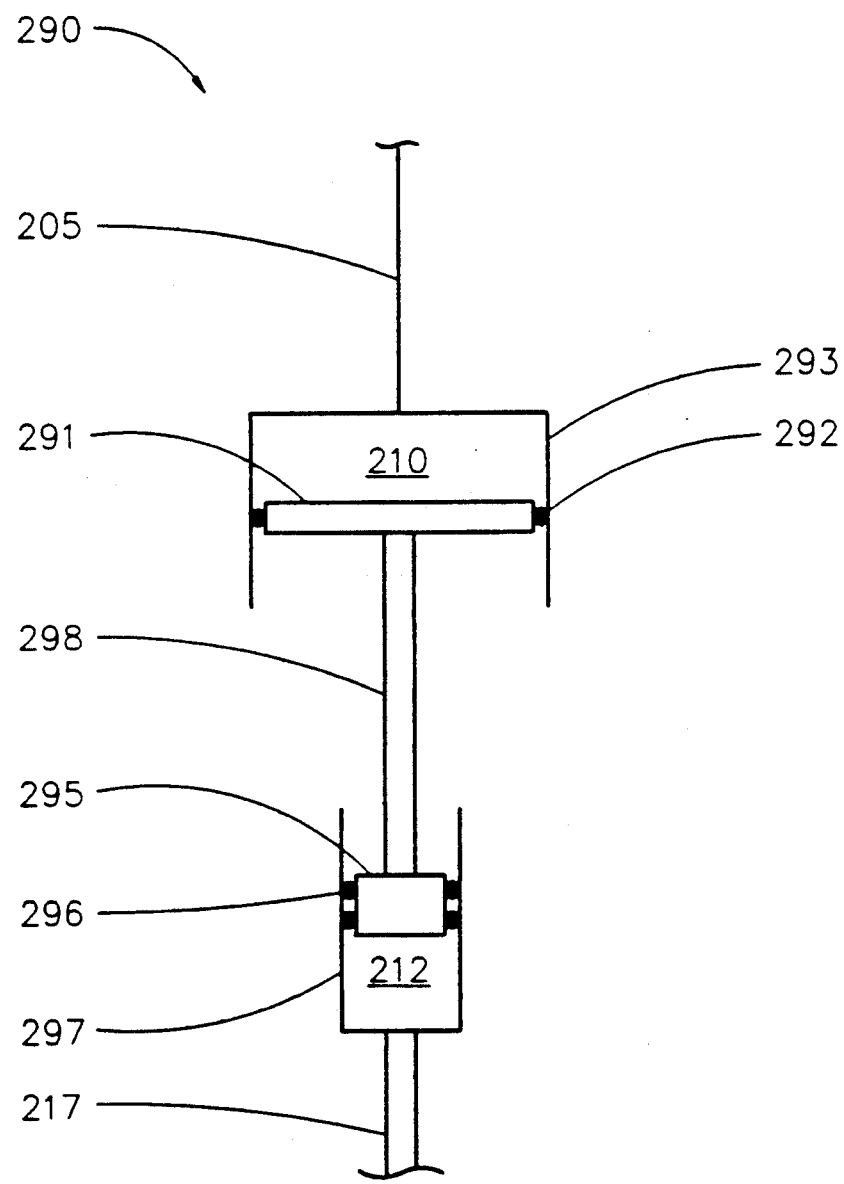
FIG. 5 shows a hydraulically actuated piston for generating pressure changes.

In order to provide reversing flow of the liquid, pump 401 is a variable displacement pump with over-centre displacement actuator 405. For low pressure applications, pump 401 may be a propeller pump with over-centre variable pitch blades. For high operating pressure of the displacement liquid, as may be obtained with piston volume displacement means as depicted in FIG. 5, pump 401 may be a variable displacement positive displacement pump such as a vane or axial piston hydrostatic pump.

Similarly, variable displacement pump 406 exchanges liquid between conduit 217E communicating with liquid displacement chamber 212E and conduit 217F communicating with liquid displacement chamber 212F. Pump 406 is driven by motor 403 through second shaft 407, and is changed in displacement by over-centre displacement actuator 408. Motor 403 with shafts 404 and 407 is a pump drive means for the first variable flow pump 401 and the second variable flow pump 406, so that the first and second variable flow pumps are mechanically coupled by the pump drive means. The over-centre displacement actuators 405 and 408 are controlled by control means 410 cooperating with the pump drive means to change the displacements of pumps 401 and 406 at the same cyclic frequency and to establish the same flow amplitude in each direction, but with a phase shift of 90° between the displacement cycling of the pumps 401 and 406. Thus, each pump operates a pair of hydraulic displacement means in opposed phase, and the two pumps operate four hydraulic displacement means phased equally 90° apart. When the potential energy stored in one pair of hydraulic displacement means is maximum because their pressures are oppositely extremized, the potential energy stored in the other pair of hydraulic volume displacement means is minimum because their pressures are equalized. Hence, the total potential energy stored in the complete apparatus is nearly constant. Likewise, total kinetic energy will be nearly constant. Hence, stored energy is balanced within the apparatus, and peak and average external power demand will be minimized.

FIG. 8

Embodiment 450 has N=2 in each of two identical working spaces. A left flow path passes from its first end 451 communicating with a left first space 452, throuqh first adsorbent bed 453 to intermediate node 454 communicating with left intermediate space 455, and through second adsorbent bed 456 to second end 457 communicating with left second space 458. The right flow path passes from first end 471 and right first space 472 through first adsorbent bed 473 to intermediate node 474 and right intermediate node 475, and through second adsorbent bed 476 to second end 477 and right second space 478.

The left and right first spaces are separated in cylinder 480 by first double-acting piston 481. Similarly, intermediate double-acting piston 482 in cylinder 483 separates spaces 455 and 475; and second double-acting piston 484 in cylinder 485 separates spaces 458 and 478.

Feed gas is supplied to the intermediate spaces by feed supply valves 490. The less readily adsorbed second product is delivered by second product valves 491, and the more readily adsorbed first product is delivered by first product valves 492 controlled by controller 496 which would respond to first product purity. The second piston 484 will have a leading reciprocating phase relative to first piston 481, and the phase of intermediate piston 482 may be intermediate.

Since each of the double-acting pistons separates two spaces of the same gas composition, leakage across these pistons is not directly detrimental to product purity, although leakage would degrade pressure ratio and energy efficiency. Drive means for the pistons are not shown, but could be linear electric motors (i.e. linear stepper or switched reluctance motors for precise position control). Another hermetic drive means could be constituted by external mechanical or hydraulic reciprocating permanent magnets outside and reciprocating coaxial with the cylinder, to drive matching permanent magnets attached to the pistons within the cylinders. The pistons could also be driven directly by small diameter piston rods (not shown), which would entail small diameter sealing penetrations.

The left and right working spaces together store potential energy which is maximum when the left and right pressures are oppositely extremized, and minimum when the pressures are equal. Kinetic energy associated with piston velocities will be approximately maximum when the pressures are equal, and minimum when the pressures are oppositely extremized. Inertia contributing to kinetic energy storage may be increased by using heavy pistons with long strokes and small diameters. Hence, the apparatus will have a resonant frequency at which energy storage is nearly constant. Over complete cycles, power will be generated by the second piston, and power will be absorbed by the first piston. If a temperature gradient is maintained in the flow paths such that the second spaces are hotter than the first spaces, excess power will be generated by the second piston according to the Stirling thermodynamic cycle, and the apparatus may then be powered thermally with drive means required only to coordinate the pistons and convey power from the second to first piston.

FIG. 9

Embodiment 500 of the invention has N=3 for each of two working spaces, and four variable volume spaces along each flow path. The volume of each variable volume space along a flow path is changed by a hydraulic volume displacement means, with the phase shifts established by hydraulic impedance between the liquid displacement chambers. A reversing liquid pump generates oscillating liquid flow between the groups of liquid displacement chambers associated With each flow path.

Apparatus 500 has a left working space with a first end of the left flow path 501 communicating with left first space 502, left first product delivery valve 503, and left first adsorbent bed 504. The left flow path passes through first adsorbent bed 504 to left first intermediate node 505, communicating with left first intermediate space 506, left feed supply valve 507 and left intermediate adsorbent bed 508. The flow path continues through left intermediate adsorbent bed 508 to left second intermediate node 509 communicating with left second intermediate space 510 and left second adsorbent bed 514, and through adsorbent bed 514 to second end 515 of the left flow path communicating with left second space 516 and left second product delivery valve 517.

Similarly, a right working space has a first end of the right flow path 521 communicating with right first space 522, right first product delivery valve 523, and right first adsorbent bed 524. The right flow path passes through first adsorbent bed 524 to right first intermediate node 525, communicating with right first intermediate space 526, right feed supply valve 527 and right intermediate adsorbent bed 528. The flow path continues through right intermediate adsorbent bed 528 to right second intermediate node 529 communicating with right second intermediate space 530 and right second adsorbent bed 534, and through adsorbent bed 534 to second end 535 of the right flow path communicating with right second space 536 and right second product delivery valve 537.

Figure 7:
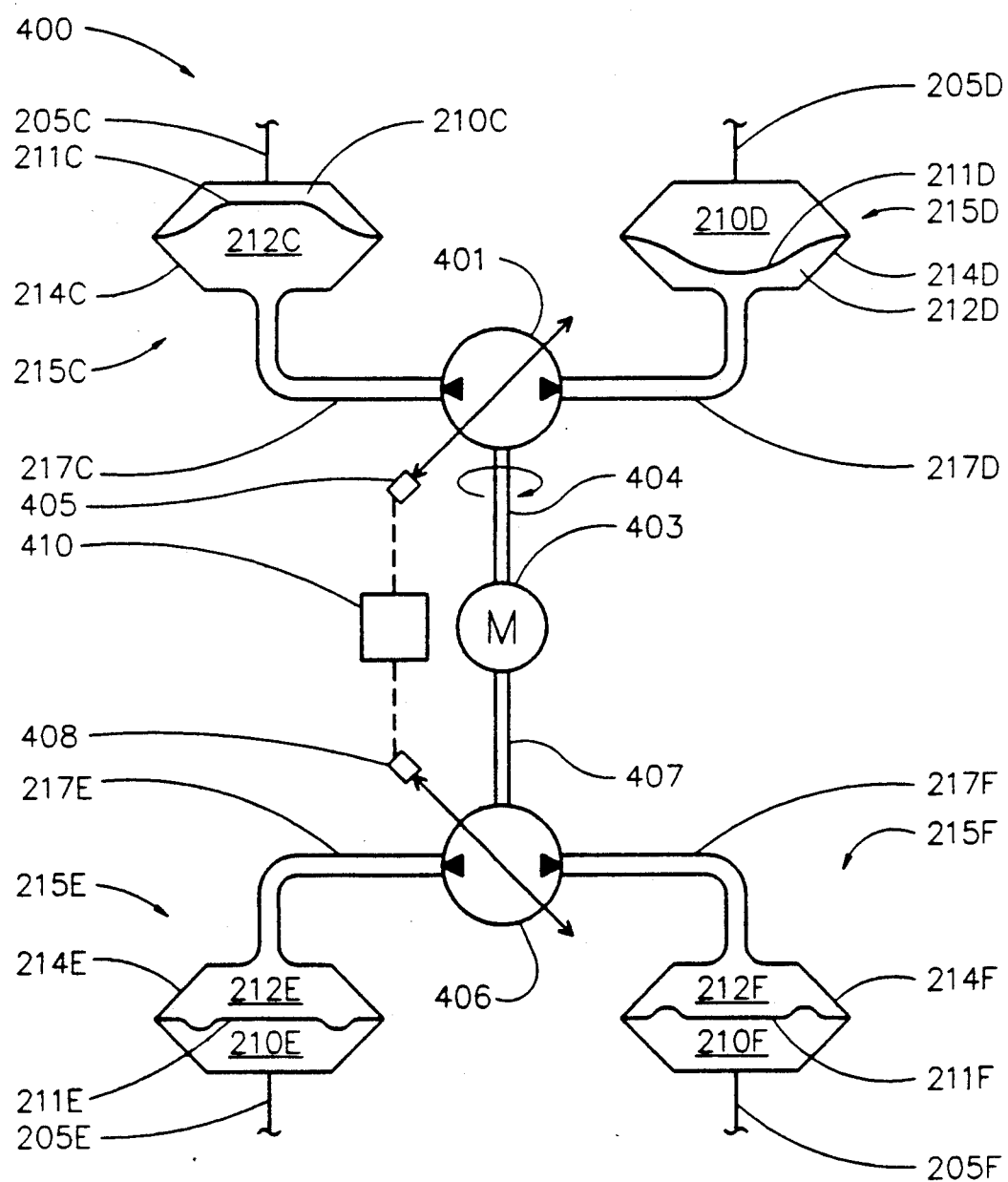
FIG. 7 shows means for achieving energy balance between four hydraulic volume displacement means phased 90° apart.
Figure 8:
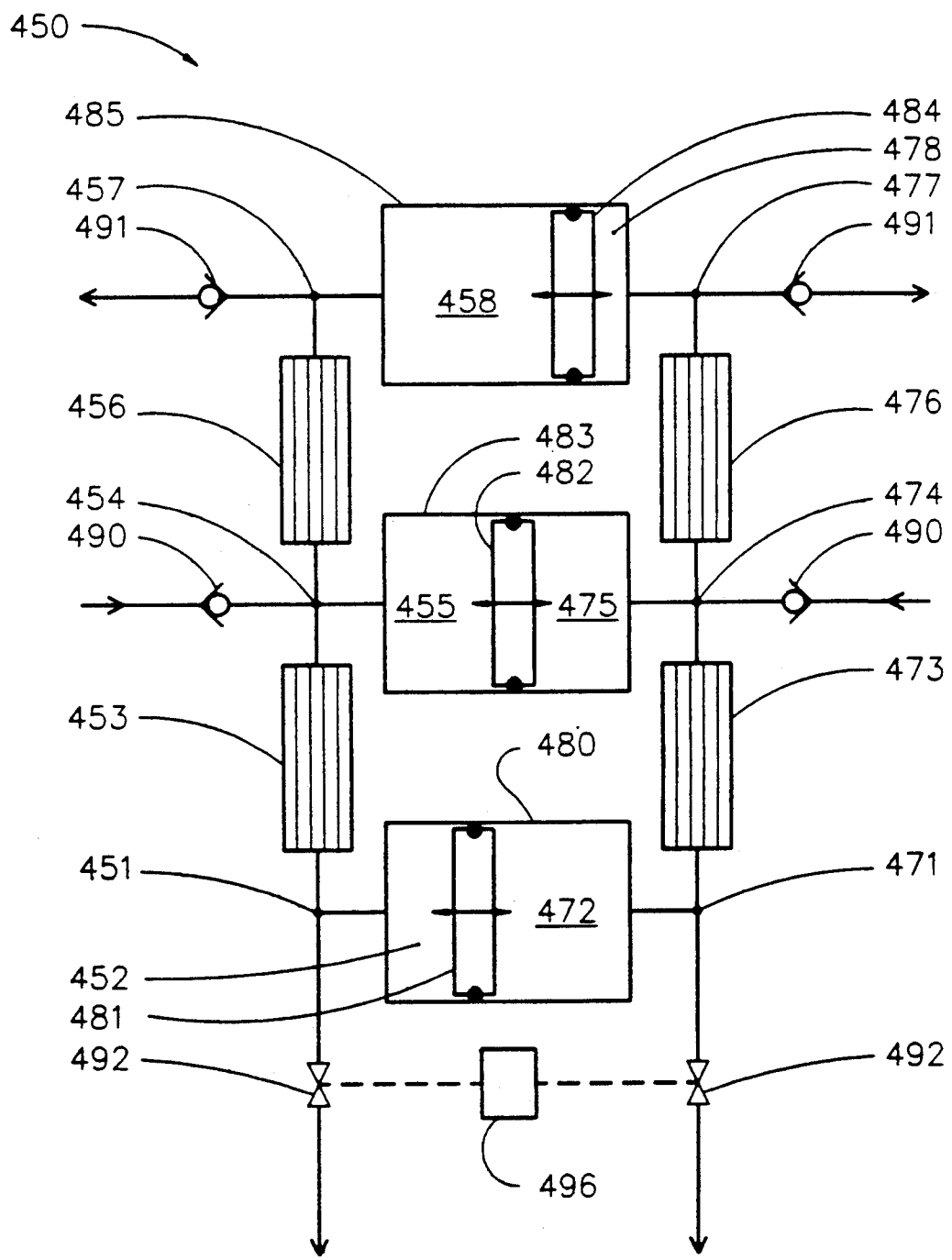
FIG. 8 shows an opposed pair of gas separators with double-acting pistons.

In embodiment 500, each of the variable volume spaces 502, 506, 510, 516, 522, 526, 530 and 536 is cyclically changed by a liquid displaced bellows, each of which forms a hydraulic volume displacement means. The bellows, or equivalent diaphragm or piston, must be leak-tight to prevent ingress of the liquid or its vapour into the working spaces. A reversing pump means 540 is provided to displace liquid back and forth between the hydraulic volume displacement means on the left and right sides of the apparatus. Pump 540 may be a fixed pitch propeller pump or fixed displacement pump whose direction of rotation is cyclically reversed as described for embodiment 300 of FIG. 6; or may be a variable pitch propeller pump or variable displacement pump driven at substantially constant shaft speed but over-centre oscillating flow, as described for embodiment 400 of FIG. 7.

Pump 540 generates reversing flow to the left side of the apparatus through left conduit 550, communicating from pump 540 to a left first liquid displacement chamber 551 displacing bellows 552 to vary the volume of space 502, and to conduit 555. Conduit 555 communicates through left first hydraulic phase-shifting means 556 to a left first intermediate liquid displacement chamber 559 displacing bellows 560 into space 506, and to conduit 561. Conduit 561 communicates through left second hydraulic phase-shifting means 562 to left second intermediate liquid displacement chamber 565 displacing bellows 566 into space 510, and to conduit 567. Conduit 567 communicates through left third phase-shifting means 568 to left second liquid displacement chamber 569 displacing bellows 570 into left second space 516.

Similarly, pump 540 transfers liquid between left conduit 550 to right conduit 580, communicating from pump 540 to a right first liquid displacement chamber 581 displacing bellows 582 to vary the volume of space 522, and to conduit 585. Conduit 585 communicates through right first hydraulic phase-shifting means 586 to a right first intermediate liquid displacement chamber 589 displacing bellows 590 into space 526, and to conduit 591. Conduit 591 communicates through right second hydraulic phase-shifting means 592 to right second intermediate liquid displacement chamber 595 displacing bellows 596 into space 530, and to conduit 596. Conduit 596 communicates through right third hydraulic phase-shifting means 597 to right second liquid displacement chamber 598, displacing bellows 599 into right second space 536.

Figure 9:
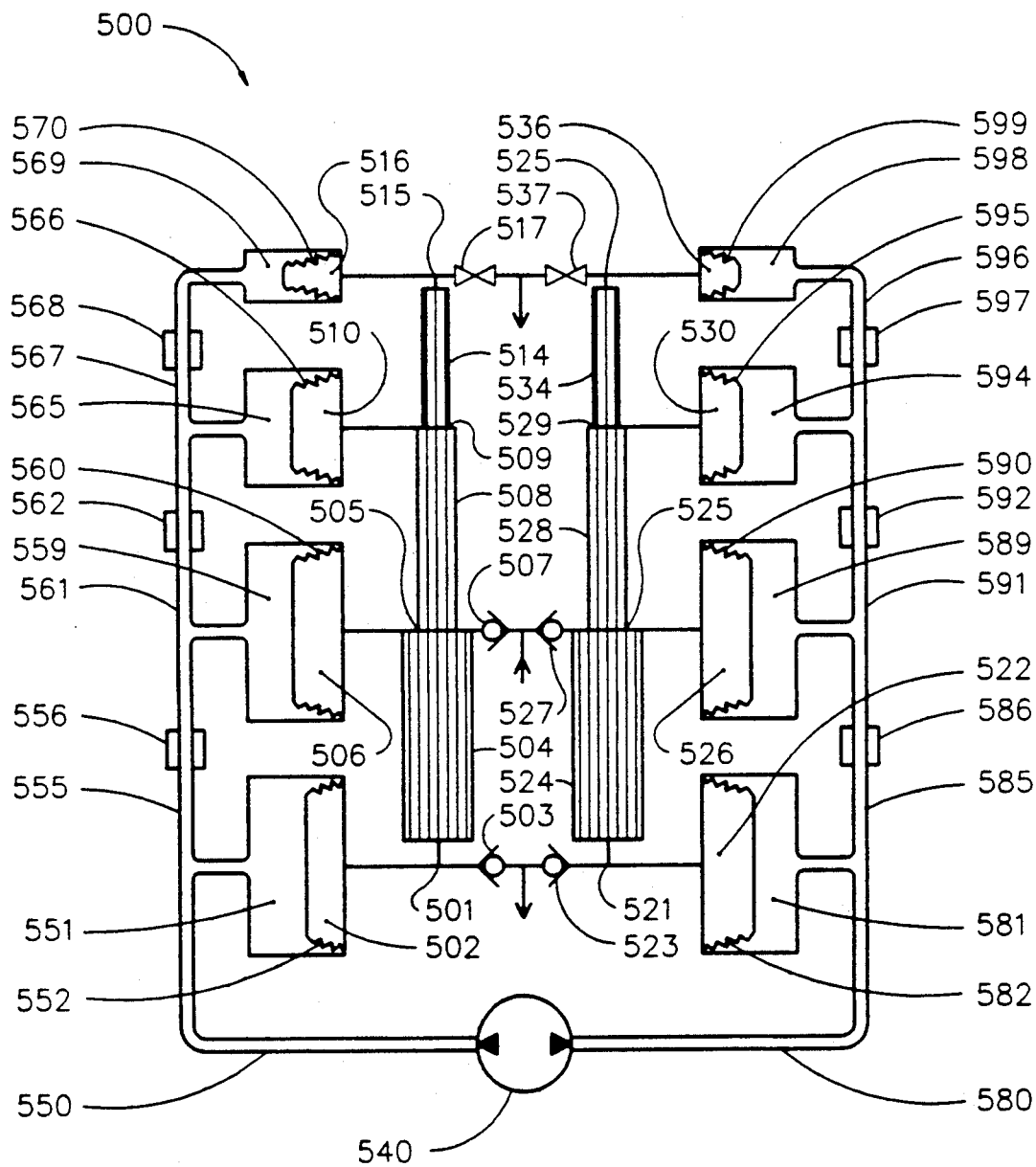
FIG. 9 shows an opposed pair of gas separators with hydraulic displacement means to establish pressure cycling and a suitable displacement phase relationship.

With utmost simplicity, the hydraulic phase-shifting means are provided by the hydraulic inertial and frictional impedance of the conduits described as communicating through such means. By providing cumulatively greater inertia in the conduits further from the pump, a phase shift will be generated between the spaces in each flow path, such that the first space has leading phase, the second space has lagging phase, and the intermediate spaces have sequentially intermediate phases between the first and second phases. Inertia in the conduits is increased by increasing conduit length or reducing conduit diameter. From FIG. 9, the above phase relationships are apparent since the conduit length between pump and each variable volume space is minimal for the first spaces and increases toward the second spaces. The phase shift between the spaces in each flow path may be increased by incorporating a spring restoring force in the bellows (as will be the case with metal bellows), and suitably designing the spring stiffness of each bellows, so that at the operating cyclic frequency, the impedance of the hydraulic volume displacement means associated with the first space in a flow path is spring-dominated, while the impedance of the hydraulic volume displacement means with associated liquid conduits is increasingly inertia-dominated progressing to the second space. The phase-shifting means may include throttle or flow control valves or other means such as flow metering pumps for precise control and adjustment.

In embodiment 500, the apparatus is operated entirely apart from valve actuation by pump 540. If the potential energy stored in the gas working spaces and by deflection of the bellows is approximately equal to the kinetic energy stored in the liquid conduits and pump, energy balancing is achieved as described for FIG. 6 above. If a variable pitch or variable displacement pump 540 is used, a second pump coupled to the same motor and operated with its flow variations 90° out of phase may be used for energy balancing, as described above for FIG. 7.

FIG. 10

Figure 10:
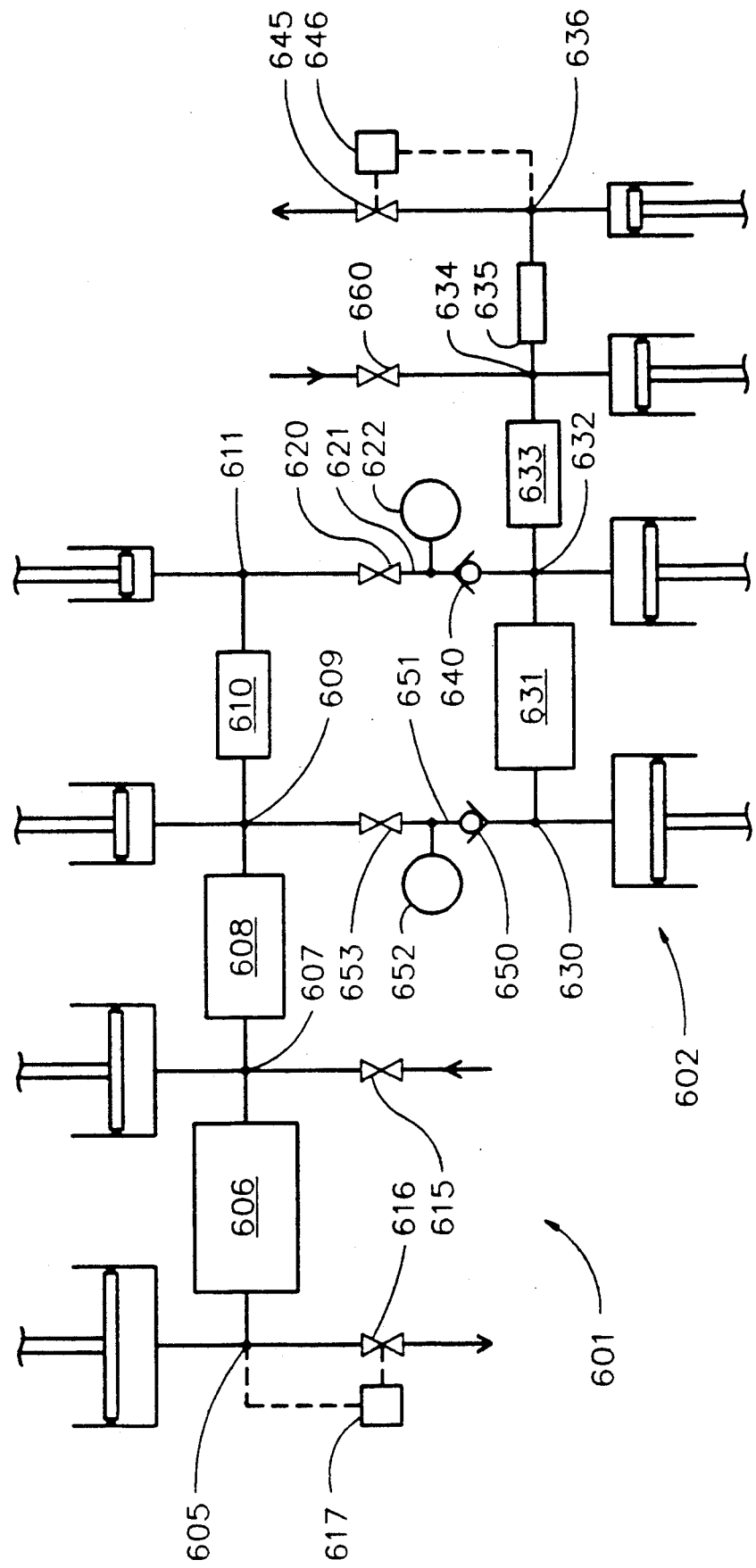
FIG. 10 shows a cascaded pair of gas separators for achieving high purity separation of both components of a gas mixture.

A gas separator according to the invention in preceding embodiments can accept a binary mixture of two components or fractions, with a feed concentration ratio of the first to the second component, and can separate those components with high purity and recovery when the ratio of first product to second product is established under steady state conditions to be approximately equal to the feed concentration ratio. Perfect simultaneous purification of both products is most difficult, although this objective may be approached more closely than in prior art separation systems. The first product will tend to have higher purity in the first component when the ratio of the first product to the second product is somewhat less than the feed concentration ratio, and the second product will tend to have higher purity in the second component when the ratio of the first to second products is somewhat greater than the feed concentration ratio. While operating with the ratio of first to second products very close to the feed concentration ratio, very high purity of both products may be achieved by operating with low feed flow rate. In order to achieve high productivity by operating with high feed flow rate, a first stage gas separator 601 in FIG. 10 is operated with the ratio of its first product to its second product considerably less than the feed concentration ratio of the first to second component. When the second component feed concentration is low (i.e. of the order of 1% or less), the ratio of first to second product may be for example about half the feed concentration ratio. Then, the first product will be highly purified with about 99% recovery, while the second component in the second product will be concentrated to about 50%. The second product of the first separator is then used as second stage feed gas mixture having a second stage feed concentration ratio to a second stage gas separator 602, which operates with its ratio of first product to second product larger than the second stage feed concentration ratio of second stage first product to second product. Now the second product of the second stage separator is highly purified, while the second stage first product is depleted in the second component relative to the second stage feed but only incompletely purified in the first component. The second stage first product is then recycled to an intermediate node of the first stage separator 601, as a supplementary feed to the first stage. The overall apparatus comprising a cascade of first stage separator 601 and second stage separator 602 is thus able to purify both feed components to an extremely high degree, while operating at high productivity of the first stage which typically is much larger than the first stage. Hence, total adsorbent inventory and physical size of the cascaded apparatus may be reduced compared to a single apparatus (such as FIG. 1) operating at low feed flow rate in order to approach high purity of both products without cascading to a second stage separator.

In the example of FIG. 10, first stage separator 601 has N=3 in a flow path with first end 605, first adsorbent bed 606, first intermediate node 607, intermediate adsorbent bed 608, second intermediate node 609, second adsorbent bed 610 and second end of the flow path 611. Variable volume spaces, with associated cyclic volume displacement means operating at a cyclic frequency, communicate with the ends of the flow path and to some or all intermediate nodes. The feed gas mixture is introduced by feed supply valve 615 to first intermediate node 607. Purified first component is withdrawn through first product delivery valve 616, which is controlled by valve controller 617 sensing purity of the first component at the first end 605 of the flow path, so that first product is only released by valve 616 when its purity is acceptable to controller 617. The second product of the first stage is concentrated in the second component, and delivered from the second end 611 of the flow path through first stage second product valve 620 communicating with conduit 621 and gas storage buffer volume 622.

Second stage separator 602 has a flow path with a first end 630, a first adsorbent bed 631, a first intermediate node 632, an intermediate adsorbent bed 633, a second intermediate node 634, a second adsorbent bed 635, and a second end 636 of the flow path. Variable volume spaces with associated cyclic volume displacement means operating at a cyclic frequency communicate with the ends and intermediate nodes of the flow path. Second stage feed is introduced to first intermediate node 632 by feed supply valve 640 which receives first stage second product gas from conduit 621 and buffer volume 622. Purified second component is withdrawn from second end 636 of the flow path by second product delivery valve 645, which is controlled by valve controller 646 sensing purity of the second component at the second end 636 of the flow path, so that second product is only released by second product delivery valve 645 when the second product purity is acceptable to controller 646. The second stage first product is discharged from the first end 630 of the flow path by second stage first product delivery valve 650, communicating to conduit 651 and buffer volume 652 which in turn communicate with a supplemental feed supply valve 653 connected to intermediate node 609 of the first stage flow path, providing means to recycle the second stage first product to an intermediate node of the first flow stage path. Thus, the second component in the first stage second product is further purified by the second stage, while the first component in the first stage second product is concentrated by the second stage and recycled to the first stage for concentration and purification.

The cascaded apparatus of FIG. 10 should be operated with suitable adsorbent bed sizing and flow rates, such that the gas mixture concentrations referred to the same pressure are the same at second end 620 and node 632, and first end 650 and node 609. Then the gas concentration in the flow paths will change monotonically from pure first component at the first stage first end 605, with increasing second component concentration sequentially at nodes 607, 609, 632, and 634 until the second component is pure at second stage second end 636.

A further generalization applies in applications where feed gas mixtures containing the first and second components in different ratios are available to the same apparatus. The feed gas mixture admitted to the feed supply valve 615 typically is rich in the first component, and contains only a small concentration of the second component. If a second feed gas mixture rich in the second component, and only containing a small concentration of the first component, is also available, that feed gas mixture should be introduced to the flow path at an intermediate node close to the second end of the flow path, so that feed gas mixture introduced to the flow path is supplied at a location and cycle time when the local concentration in the flow path has about the same concentration as the feed gas. To illustrate this generalization, which is applicable to single or cascaded gas separators according to the invention, a supplementary feed gas supply valve 660 is shown communicating to second intermediate node 634 of the second stage flow path. A feed gas mixture that is already nearly purified in the second component could be introduced by supplementary feed valve 660.

FIG. 11

Apparatus 700 is configured for separating the three components of a ternary gas mixture, and thus has a branched flow path to provide three flow path ends to which a product component can be concentrated. The feed gas mixture contains first, second and third components which will be separated into first, second and third products respectively. One of the first or second components is more readily adsorbed than the other, and the third component is intermediate in readiness of adsorption between the first and second component. Another feature illustrated in FIG. 11, which may be applied independently to other embodiments, is a further branching of the flow path at the first intermediate node so that the feed is introduced through a feed adsorbent bed within the working space, so that an undesired strongly adsorbed gas component or vapour (in addition to the two or three components to be separated as products) can be captured and eliminated before the gas mixture reaches the first intermediate node.

The apparatus 700 has a first end of the flow path 701 communicating with first space 702, first adsorbent bed 703, and first product delivery valve 704. The flow path passes through adsorbent bed 703 to first intermediate node 705, at which the feed gas mixture is introduced to the flow path. The flow path passes from first intermediate node 705 through first intermediate adsorbent bed 706 to second intermediate node 707, at which the flow path branches into a first branch and a second branch.

The first flow path branch continues from second intermediate node 707 through second intermediate adsorbent bed 710 to third intermediate node 711 communicating with a second intermediate space 712 and second adsorbent bed 713, through which the second flow path continues to second flow path end 714. Second flow path end 714 communicates with second space 715 and second product delivery valve 716. The second flow path branch continues from second intermediate node 707 through third adsorbent bed 720 to third flow path end 721, communicating with third space 722 and a third product delivery valve 723.

The first component is either more or less readily adsorbed than the second and third components. The principle of the present apparatus in separating a ternary mixture is to establish a concentration gradient of the first component along the flow path, so that the gas at first flow path end 701 is substantially pure first component, at node 705 is more or less feed gas mixture concentration, and at node 707 is a mixture of the second and third components with substantially no first component. The flow in the flow path is coordinated with pressure changes such that gas contacting the adsorbent beds in the flow path is relatively enriched in the first component when flowing toward the first flow path end, and relatively depleted in the first component when flowing toward the second and third flow path ends. Thus, the first component is inhibited from passing through adsorbent bed 706 from node 705 to reach node 707 branching to the second and third flow path branches. The flow in the second and 25 third flow path branches is then coordinated with changes in working pressure, so that there is net flow from the second flow path end to the third flow path end when the gas mixture contacting the adsorbent beds in the second and third flow path branches is relatively enriched in the third component, and there is net flow from the third flow path end to the second flow path end when the gas contacting the adsorbent beds in the second and third flow path branches is relatively enriched in the second component.

The above specified flow and pressure relationships can be achieved by operating the volume displacement means associated with the first, second and third spaces, so that the first and second spaces cycle in volume with a phase difference to achieve separation between the first and second components, one of which is more readily adsorbed than the other; and the third space cycles in volume at a phase intermediate between the first and second spaces since the third component has intermediate readiness of adsorption between the first and second components.

While the feed gas mixture could here be introduced by a feed supply valve directly to the first intermediate node as described for other embodiments, another optional feature is illustrated which enables removal of a strongly adsorbed vapour before the feed gas reaches the main flow path. A feed adsorbent bed 730 communicates with first intermediate node 705, and forms a flow path branch which passes from node 705 through feed adsorbent bed 730 to a feed end 731 of adsorbent bed 730, with feed end 731 communicating with feed supply valve 732 and an exhaust valve 733. Feed gas mixture containing the strongly adsorbed vapour component is introduced to feed end 731 during an interval of relatively high working pressure when the feed supply valve 732 is opened, and feed gas mixture then flows to intermediate node 705 and into the main flow path, while the strongly adsorbed vapour component is retained in adsorbent bed 730 near feed end 731 without penetrating to intermediate node 705. During the subsequent interval of relatively low working pressure, exhaust valve 733 is opened to permit some gas mixture in the flow path to enter adsorbent bed 730 from node 705, and flow through adsorbent bed 730 and out through exhaust valve 733 to purge the strongly adsorbed vapour which was adsorbed at higher pressure and is desorbed at lower pressure. Thus, means is provided to remove a strongly adsorbed vapour which will thus not be a product of the separation, with the penalty of using some of the gas mixture containing desirable products as purge gas which will not be recovered in this apparatus. This feature may be added to any embodiment of this invention, whether used in separation of gas mixtures containing two or three (as in FIG. 11) components in addition to the strongly adsorbed vapour, and is particularly useful in air separation to remove water vapour so that dry nitrogen and oxygen products may be separated without deactivation of a zeolite adsorbent by water vapour.

In FIG. 11, each of the first, second and third adsorbent beds 703, 713 and 720 has a similar cross-section to, and is mounted coaxially to, the corresponding first, second and third space 702, 715 and 722; so that gas flows between the adsorbent beds and the spaces at each flow path end with substantially uniform velocity transverse to the flow path. Coaxial mounting of the adsorbent bed and variable volume space having similar cross-section at a flow path end is thus means to establish substantially uniform flow in the variable volume space, so as to maintain substantial axial stratification of the gas within the variable volume space for improved purging effectiveness and product purity.

Conventional adsorbent beds of randomly packed pellets would present some difficulties in retaining the adsorbent pellets at the end of e.g. adsorbent bed 703 mounted coaxially to and opening into the variable volume space 702 at first flow path end 701, while also providing desired flow distribution uniformity. Packed adsorbent beds tend to generate dust from attrition due to bed movement under reversing flow conditions, while dust and abrasive materials will cause undesirable wear of piston seals and sliding surfaces. Furthermore, it has been found that packed beds cannot be operated at cycle speeds much more than about 50 RPM, without unacceptable degradation of performance, high pressure drops, and rapid adsorbent attrition. To achieve necessary mass transfer rates between the adsorbent pellets and interstitial gas rates for adequate adsorption response at higher cycle speeds, the pellets must have smaller diameter, compounding the above problems. High cycle RPM is most desirable in gas separation devices using pistons or similar volume displacement means, in order to reduce the size and cost of mechanical parts, but cannot be achieved with prior art adsorbent beds.

Thus, preferred adsorbent bed configurations would use parallel channel monoliths with extremely narrow channels, for example resembling ceramic honeycomb catalyst supports, to provide a rigid adsorbent structure with low axial pressure drop even at high flow velocities, and resistant to attrition. Unfortunately, to achieve adequate mass transfer and adsorption uptake between the adsorbent and the gas mixture in the channels at desired high cycle rates, the adsorbent wall thickness and channel width must be smaller as cycle speed is approached. Commercial ceramic honeycombs have channels that have been found experimentally to be much too large for the present requirements. Conventional extrusion techniques do not enable the desired narrowing of channels, with requisite uniformity between the channels. Also, the fragile zeolite adsorbents and binders used for commercial pellets are apparently unsuitable for extrusion in unreinforced extended structures with sufficiently narrow channel dimensions.

Hence, as a further independent aspect of the present invention applicable most generally in the field of adsorption separations, preferred adsorbent bed configurations are composed of layered sheets of the adsorbent material attached by a suitable binder to a reinforcement material. The reinforcement material may itself be a sheet, or may be woven or non-woven fibrous material. The adsorbent material may be coated on the reinforcement material, or formed in an intimate matrix with a fibrous reinforcement material. The binder may be an organic or inorganic substance, or the adsorbent material itself. The sheets are prepared with highly uniform thickness and smoothness of the adsorbent surface. The loading of adsorbent material in the sheets is high, typically at least twice the macropore voidage within the sheets. However, the macroporosity within the sheets is sufficiently open and interconnected to facilitate adsorption mass transfer.

Referring to FIG. 11 which shows a simplified section of apparatus 700 and adsorbent bed 703 in particular, adsorbent sheets 740 and 742 are separated by channel 745. The adsorbent sheets and channel extend along the flow path over the length of bed 703. The bed 703 comprises a large number of alternating sheets and channels, more numerous and closely spaced than suggested by FIG. 11. The channels comprise substantially the entire flow path through the bed, and are defined by spacers between adjacent sheets. The channels are required to be substantially identical in gap width and length to ensure close transverse uniformity of flow velocity in the flow path.

Figure 12:
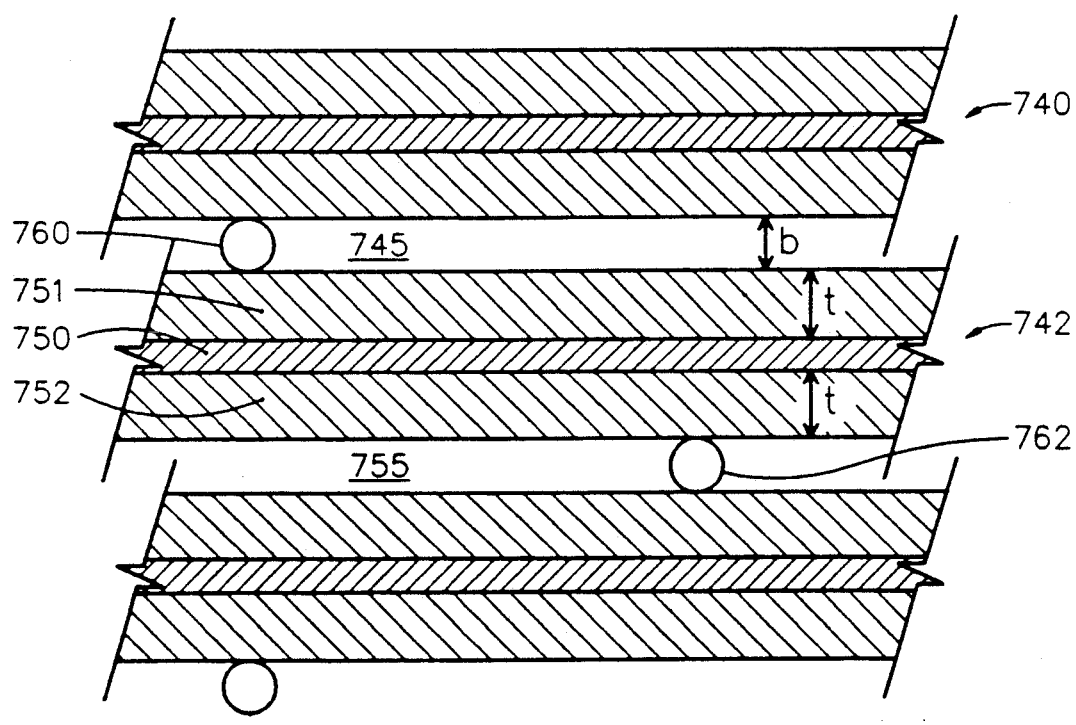
FIG. 12 shows a detail of a layered sheet adsorbent bed.

The adsorbent sheets 740 and 742 of bed 703 may be layered as a stack of flat sheets, cut to fit within a desired cross-sectional shape which may be round or polygonal according to the housing geometry. Alternatively, the sheet 740 may be rolled in a spiral roll around a central core, so that adjacent layer 742 is the next coil of the same sheet, and the cross-sectional shape is then approximately round. Further details are provided below with FIG. 12.

EXAMPLE NO. 3

The feed gas to apparatus 700 is air, from which purified oxygen, nitrogen and argon are desired products. Conventional pressure swing adsorption systems using zeolite adsorbents over which nitrogen is more readily adsorbed than oxygen and argon cannot produce better than 95% purity oxygen because of argon concentration into the oxygen product, and cannot readily concentrate nitrogen unless water vapour has previously been removed from the feed. Conventional systems using a kinetic separation over carbon molecular sieves, over which oxygen is more rapidly adsorbed than nitrogen and argon, are useful in inert gas generation but are not easily optimized for production of pure oxygen.

In this example, the adsorbent in feed adsorbent bed 730 is a desiccant such as alumina gel. The adsorbent in beds 703 and 706 is a zeolite molecular sieve such as 10X. The adsorbent in beds 710, 713 and 720 is carbon molecular sieve. The apparatus is operated with a leading phase of volume changes on second space 715, a lagging phase of volume changes in first space 702, and an intermediate phase of volume changes in third space 722. Thus, water vapour in the feed air is removed before the feed gas reaches first node 705. Nitrogen is concentrated as the first product to the first flow path end 701, and is removed from gas mixture passing from adsorbent bed 706 to node 707. Argon is concentrated to the second flow path end 74, while purified oxygen is delivered at third flow path end 721.

FIG. 12

A detail of layered sheet adsorbent bed 703 is shown, with typical adsorbent sheets 740 and 742 on either side of typical channel 745. Typical adsorbent sheet 42 has reinforcement material 750, a first adsorbent layer 751 contacting channel 745, and a second adsorbent layer 752 contacting channel 755. The adsorbent layers 751 and 752 may be distinct as illustrated from reinforcement material 750, which may be a metal foil or a glass fibre fabric.

Alternatively, adsorbent layers 751 and 752 may be interspersed mutually with a fibrous form of reinforcement material 750, which may be a woven or non-woven fabric, or simply random fibres in a matrix with the adsorbent material. The half sheet adsorbent thickness is defined as the effective thickness of adsorbent layers 751 and 752 on each side of the sheet, i.e. not counting any interdispersed reinforcement material, is dimension "t".

Channels 745 and 755 are defined and maintained with substantially equal in gap width dimension "b" by spacers 760 and 762 respectively. The spacers may be axially extended parallel to the flow path, and then may be provided as glass fibres or metal wires, or as ridges or protrusions of equal height on one side of sheets 740 and 742. The spacers should be well separated, so that occlusion of the flow channels is minimized.

Preferred adsorbent materials for the layered adsorbent bed 703 include the aluminosilicate zeolites, amorphous alumina or silica gels. Other adsorbents of interest include active carbon adsorbents, and polymer adsorbents. Binders may be based on inorganic substances such as clays, alumina or silica gels, on carbon chars, or on organic compounds such as PTFE suspensions, silicones, or on polyimide or other temperature-resistant adhesives. Any binder system used to form adsorbent pellets may be used to form adsorbent sheets 740.

Common binders for zeolites are based on clays, and indeed the same clay may be a parent material for separate or in-situ zeolite synthesis. Many methods are known in the prior art for forming zeolite pellets, often by forming a clay-bound matrix from zeolite powder, or by forming the pellet from clay or a metakaolin which is subsequently converted to zeolite. These methods may be adapted to coating zeolites with a clay binder on a glass fibre fabric, or to form the sheet 740 by papermaking techniques with random or aligned fibres of glass or mineral with a zeolite and clay binder matrix; or equivalently coating a fabric or forming a sheet matrix with clay which is later converted to zeolite. It is also known to coat oxide materials, including glass fibre material or anodized surfaces of aluminum foil, with zeolite or amorphous adsorbent coatings. Sol gel techniques may be used to form such coatings, either as a microporous amorphous layer or as a matrix of zeolite powder filler in a qel framework. The reinforcement material must be able to withstand the highest processing temperatures, as may be required for calcining a clay or activating the final adsorbent.

Figure 13:
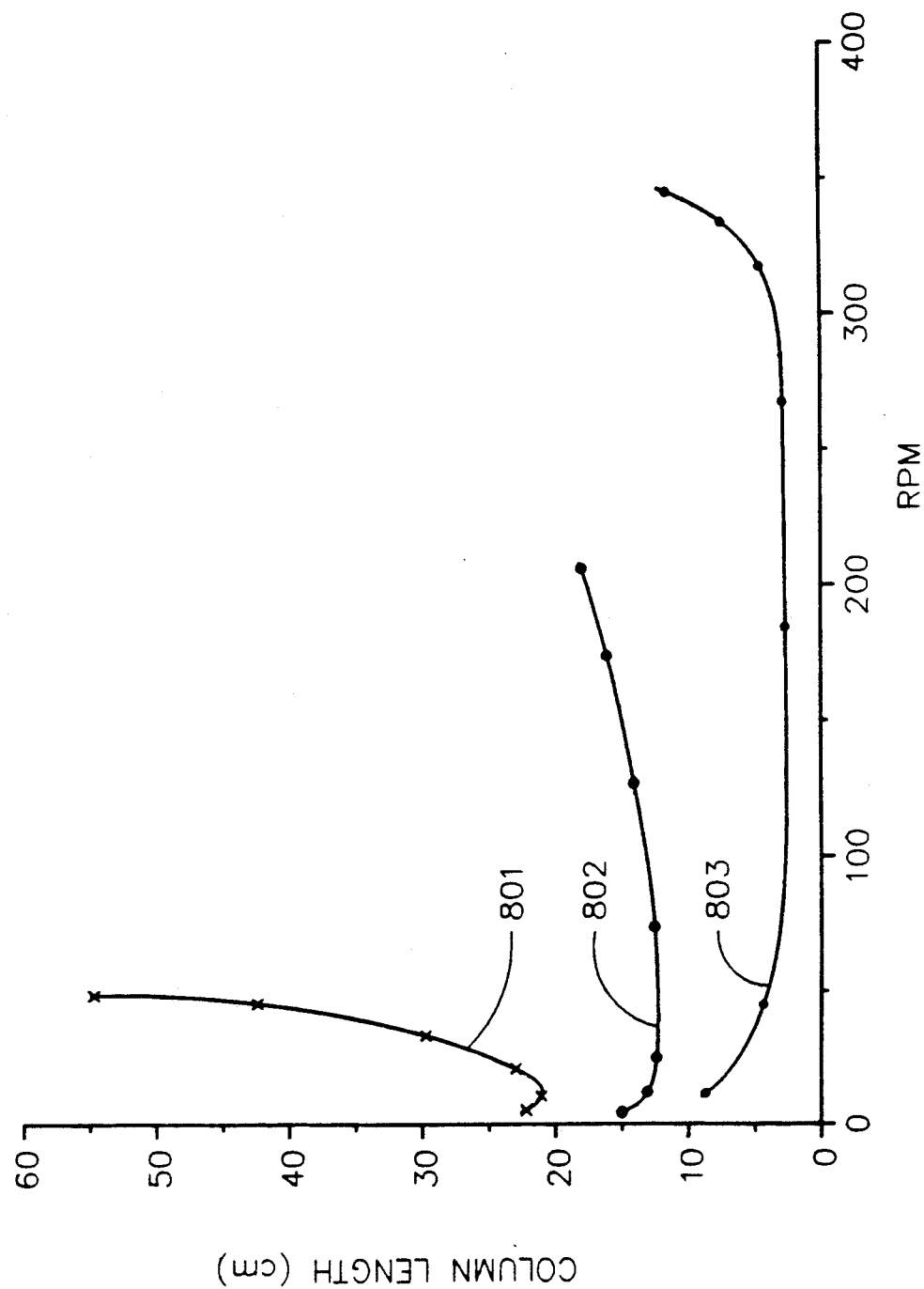
FIG. 13 shows adsorbent column length.
Figure 14:
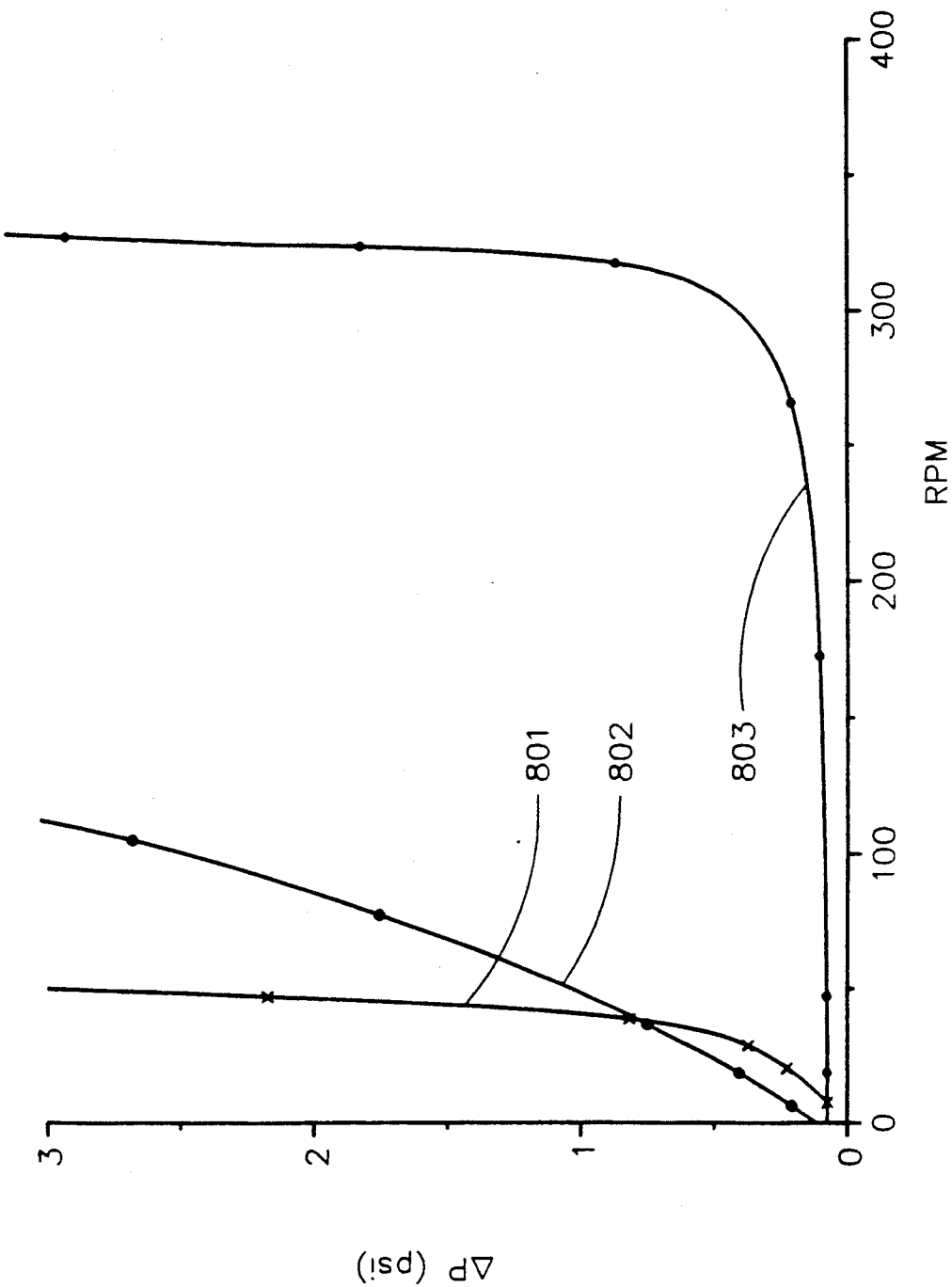
FIG. 14 shows pressure drop amplitude, versus cycle RPM for alternative adsorbent geometries using pellets or layered sheets.

FIGS. 13 and 14

A careful theoretical analysis was performed of mass transfer and pressure drop scaling in adsorbent beds based on either packed beds of spherical pellets or layered sheets, with important and entirely unexpected results.

This analysis considered the important application of air separation, with nitrogen adsorption on $13 \times$ zeolite at ambient temperature. The bulk adsorbent, formed either as pellets or in sheets with glass fibre reinforcement material, was assumed to use the same binder and to have identical micropore crystal parameters and macropore morphology. Spheres were characterized by their diameter "d", and layered sheets by the dimensions "b" (half sheet adsorbent thickness) and "t" (channel gap width). The ratio [b/t] is desirably near unity for good adsorption uptake, but may vary over a range of roughly $0.5 < [b/t] < 2$.

In adsorption apparatus of the present class, characterized by using variable volume means at one or both ends of the flow path through the adsorbent bed to generate the pressure swings and coordinated approximately sinusoidal flow oscillations, the velocity amplitude "v" at any point of the adsorbent bed is proportional to bed length "L" and cycle frequency "N". Thus, $v \sim N.L$. In laminar flow through narrow channels, pressure drop amplitude is proportional to $\{N.[L/b]^2\}$.

Also, the separation duty requires keeping the concentration wavefront or mass transfer zone confined within the length of the adsorbent bed to achieve purification objectives without breakthrough of impurities into the product. From well known mass transfer correlations, it follows that $$L = A + B/v + C.v$$

where "A" is a term accounting for axial dispersion eddy mixing due to bed irregularities and "B" reflects molecular diffusion. "C" is the sum of mass transfer resistance due to film boundary layers, macropore gas diffusion into the bulk adsorbent, and micropore diffusion into the zeolite crystals. When macropore diffusion resistance dominates over micorpore resistance, as expected here, the coefficient "C" is quadratically dependent on pellet sphere diameter or adsorbent sheet thickness.

From the above relations, it follows that for each adsorbent bed geometry in this class of adsorption apparatus there is a maximum limiting cycle frequency which is inversely proportional to "C" (or to the square of pellet diameter or sheet thickness), which cannot be reached or exceeded. This explains why small pellet diameters or thin sheets are required for high cycle RPM. In the present invention, the channel gap width between adjacent adsorbent sheets will be in the typical range of 5 microns to 200 microns, with a preferred range of 15 microns to 75 microns.

FIG. 13 shows adsorbent bed length versus cycle frequency in RPM, and FIG. 14 shows adsorbent bed pressure drop amplitude also versus cycle frequency. Packed beds were calculated for sphere diameters of 500 microns (curve 801 in FIGS. 13 and 14) and 200 microns (curve 802), and for a layered sheet adsorbent bed with $b = t = 50$ microns (curve 803). It was assumed that effective channel width tolerances on the layered sheet bed could be held to $+/-20\%$. According to known correlations, the smaller spheres were penalized by more severe axial dispersion. The behaviour shown in FIGS. 13 and 14 for the pellet configurations is in good accordance With my experimental observations.

As seen in FIGS. 13 and 14, the attainable cycle frequency of the layered sheet configuration is predicted to be superior by almost an order of magnitude, while the necessary bed length is reduced by a similar factor. These improvements will enable radical miniaturization and cost reduction of the gas separation apparatus, with major impact on the gas separation industry.

The exceptional performance of the layered sheet adsorbent bed is attributed to (1) the ability to fabricate and assemble a high surface area sheet structure with closely uniform and smooth channels, while a packet bed of pellets is inherently highly rough especially with small diameters; and (2) the low pressure drop of this geometry despite the small dimensions of adsorbent layer thickness and channel gap width.

It will be understood that the different aspects of the present invention may be expressed with much diversity and in many further combinations, under the scope of the following claims.

I claim:

1. A process for separating and concentrating first and second components of a feed gas mixture, the feed gas mixture having a feed concentration ratio between the first and second components, and one of the first and second components being more readily adsorbed under increase of pressure relative to the other component which is less readily adsorbed under increase of pressure over an adsorbent, such that a gas mixture of the first and second components contacting the adsorbent is relatively enriched in the first component at a first pressure and relatively enriched in the second component at a second pressure when the pressure is cycled between the first and second pressures at a cyclic frequency; providing for the process a flow path through a number "N" of at least two interconnected adsorbent beds in a working space within which the gas mixture has a working pressure, the flow path having first and second ends and at least one intermediate node including a first intermediate node, where each intermediate node is in the flow path between adjacent adsorbent bed segments, so that the flow path passes through a first adsorbent bed of the absorbent material in the flow path between the first end of the flow path and the first intermediate node, and through a second adsorbent bed in the flow path between the second end of the flow path and an intermediate node, which is the first intermediate node in the case that N=2; communicating within the working space a first space communicating with the first end of the flow path, a second space communicating with the second end of the flow path, and an intermediate space communicating with an intermediate node of the flow path; performing volume changes with an amplitude and phase at the cyclic frequency in each of the first space, second space, and intermediate space; and establishing a phase difference between the volume changes of the first and second space; and the process including the cyclically repeated steps at the cyclic frequency and in some sequence of:

(a) introducing the feed gas mixture to adjacent the first intermediate node of the flow path, (b) changing the volume of the first space, the second space and the intermediate space, and establishing an amplitude and phase of the volume changes at the cyclic frequency in each of the first space, second space and intermediate space, so as to change the volume of the working space in order to change the working pressure between the first pressure and the second pressure, (c) while the working pressure is substantially at the first pressure, so that the gas mixture contacting the adsorbent beds is relatively enriched in the first component, expanding the first space while contracting the second space; so as to generate flow in the flow path directed from the second space to the first space, to accumulate within the first space some gas enriched in the first component which has flowed into the first space from the first adsorbent bed, and also to purge the second adsorbent bed with gas which was in the second space, (d) changing the volume of the working space in order to change the working pressure from substantially the first pressure to substantially the second pressure, (e) while the working pressure is substantially at the second pressure, so that the gas mixture contracting the adsorbent beds is relatively enriched in the second component, expanding the second space while contracting the first space; so as to generate flow in the flow path directed from the first space to the second space, to communicate within the second space some gas enriched in the second component which has flowed into the second space from the second adsorbent bed, and also to purge the first adsorbent bed with gas which was in the first space, (f) changing the volume of the working space in order to change the working pressure from substantially the second pressure to substantially the first pressure, (g) withdrawing from adjacent the first end of the flow path a first product gas enriched in the first component, (h) withdrawing from adjacent the second end of the flow path a second product gas enriched in the second component, (i) controlling the withdrawal of the first and second product gases, so as to achieve high concentration and recovery of both the first component in the first product and the second component in the second product.

2. The process of claim 1, further providing at least one intermediate node in addition to the first intermediate node in the flow path, and an intermediate adsorbent bed between each adjacent pair of intermediate nodes, so that the number of adsorbent beds "N" is at least three.

3. The process of claim 2, further changing the volume of an intermediate space communicating with each intermediate node except the first intermediate node to which the feed gas mixture is introduced.

4. A process of claim 2, further changing the volume of an intermediate space communicating with each intermediate node including the first intermediate node to which the feed gas mixture is introduced.

5. The process of claim 2, in which the first component is a majority component and the second component is a minority component, providing the adsorbent beds in the flow path between the first and intermediate node and the second end of the flow path in sequentially smaller sizes descending toward the second end of the flow path, so that the second adsorbent bed is smallest, and establishing the amplitude of volume changes of the second space to be smaller than the amplitude of volume changes of the first space.

6. The process of claim 5, in which the feed concentration ratio of the first component to the second component is of the approximate order of 10:1, and "N"=3.

7. The process of claim 5, in which the feed concentration ratio of the first component to the second component is of the approximate order of 100:1, and "N"=4.

8. The process of claim 5, in which the feed concentration ratio of the first component to the second component is of the approximate order of 1000:1, and "N"=5.

9. The process of claim 1, further establishing the volume changes of an intermediate space to be in phase with volume changes of the first space.

10. The process of claim 1, further establishing the volume changes of an intermediate space to be in phase with volume changes of the second space.

11. The process of claim 1, further establishing the phase of volume changes of an intermediate space to be intermediate in phase between the volume changes of the first and second spaces.

12. The process of claim 1, further establishing the amplitude of volume changes in the first and second spaces to be approximately equal, and also providing only one intermediate space which communicates with the second absorbent bed.

13. The process of claim 2, in which the first component is a majority component and the second component is a minority component, so that the feed concentration ratio of the first to the second component is greater then unity, further establishing the volume changes in the intermediate space to be substantially in phase with volume changes of the first space.

14. The process of claim 1, further establishing the amplitudes of the volume changes in the first and second spaces to be in a ratio in approximate proportion to the feed concentration ratio of the first to the second component.

15. The process of claim 1 in which the feed gas mixture includes a third component which under increase of pressure is more readily adsorbed than the less readily adsorbed of the first and second components, and less readily adsorbed than the more readily adsorbed of the first and second components, further providing a second flow path branching from the first flow path from a second intermediate node between the first intermediate node and the second end of the flow path, with the second flow path passing through a third adsorbent bed to a third flow path end, and coordinating volume changes at the first, second and third flow path ends so that the phase of volume changes at the third flow path end is intermediate between the phase of volume changes at the first and second flow path ends, so as to concentrate the first component to the first flow path end, the second component to the second flow path end, and the third component to the third flow path end.

16. The process of claim 1, further withdrawing the first and second products in a ratio of the first and second products less than the feed concentration ratio of the first and second components, so as to obtain a first product of enhanced purity in the first component.

17. The process of claim 16 as a first stage, and providing a similar second stage, further taking the second product of the first stage which is incompletely purified in the second component as feed gas mixture to the second stage, and withdrawing the first and second products of the second stage in a ratio less than the feed concentration ratio of the first and second components of the second stage, so as to obtain a second product of enhanced purity from the second stage, while returning the impure first product of the second stage to an intermediate node of the flow path of the first stage; whereby operating the first and second stages as a cascade to purify the first and second components, and withdrawing highly purified first and second products from the first and second stages respectively.

18. Apparatus for separating and concentrating first and second components of a feed gas mixture, the feed gas mixture having a feed concentration ratio between the first and second components, and one of the first and second components being more readily adsorbed under increase of pressure relative to the other component which is less readily adsorbed under increase of pressure over an adsorbent material, such that a gas mixture of the first and second components contacting the adsorbent is relatively enriched in the first component at a first pressure and relatively enriched in the second component at a second pressure when the pressure is cycled between the first and second pressures at a cyclic frequency; and the apparatus including:

(a) a working space including a flow path passing through at least two adsorbent beds of the adsorbent material, the flow path having first and second ends, and the flow path having an intermediate node between each adjacent pair of adsorbent beds, so that the flow path has at least one intermediate node, (b) a first adsorbent bed of the adsorbent material in the flow path, and between the first end and an intermediate node of the flow path, (c) a second adsorbent bed in the flow path, and between an intermediate node and the second end of the flow path, (d) feed supply means for introducing the feed gas mixture to adjacent an intermediate node of the flow path, (e) first product delivery means for withdrawing a first product enriched in the first component from adjacent the first end of the flow path, (f) second product delivery means for withdrawing a second product enriched in the second component from adjacent the second end of the flow path, (g) first cyclic volume displacement means to change the volume of a first space within the working space and communicating with the first end of the flow path, (h) second cyclic volume displacement means to change the volume of a second space within the working space and communicating with the second end of the flow path, (i) an intermediate cyclic volume displacement means to change the volume of an intermediate space within the working space and communicating with an intermediate node of the flow path, (j) drive means to operate the first, second and intermediate volume displacement means at the cyclic frequency, so as to change the working pressure between the first and second pressures, (k) means to coordinate the relative phase of the volume displacement means, to provide a phase difference between the first and second volume displacement means so as to generate flow in the flow path directed from the second space to the first space while the working pressure is substantially at the first pressure, and also to generate flow in the flow path directed from the first space to the second space while the working pressure is substantially at the second pressure, (l) means for expanding the first space and contracting the second space while the working pressure is substantially at the first pressure, so as to accumulate within the first space some gas enriched in the first component which has flowed into the first space from the first adsorbent bed, and also to purge the second adsorbent bed with gas which was in the second space, (m) means for expanding the second space and contracting the first space while the working pressure is substantially at the second pressure, so as to accumulate within the second space some gas enriched in the second component which has flowed into the second space from the second adsorbent bed, and also to purge the first adsorbent bed with gas which was in the first space, (n) means for controlling the withdrawal of the first and second product gases, so as to achieve high concentration and recovery of both the first component in the first product and the second component in the second product.

19. The apparatus of claim 18, with at least two intermediate nodes in the flow path and further including an intermediate adsorbent bed in the flow path between each adjacent pair of intermediate nodes.

20. The apparatus of claim 18, with means to establish the volume changes of an intermediate space to be in phase with volume changes of the second space.

21. The apparatus of claim 18, with means to establish the phase of volume changes of the intermediate space to be intermediate in phase between the volume changes of the first and second spaces.

22. The apparatus of claim 21, in which the phase of volume changes in the first, second and the intermediate space are established by the relative impedance of hydraulic connections between hydraulic volume displacement means to cyclically change the volumes of the first, second and intermediate spaces, which are driven in parallel by a single pump.

23. The apparatus of claim 21, further providing only one intermediate space.

24. The apparatus of claim 18, with the amplitude of volume changes in the first and second space approximately equal.

25. The apparatus of claim 18, with means to determine the amplitudes of the volume changes in the first and second spaces in a ratio in approximate proportion to the feed concentration ratio of the first to the second component.

26. The apparatus of claim 18 with the flow path branched from an intermediate node so that the working space has three flow path ends including a third flow path end, and with an adsorbent bed in the flow path branch to the third end.

27. The apparatus of claim 26, with at least two adsorbent beds in the flow path between the first end of the flow path and the intermediate node at which the flow path is branched, and with the feed supply means communicating with another intermediate node between the said two adsorbent beds; and with a variable volume third space and a cooperating cyclic volume displacement means at the third flow path end, with means to establish the phase of volume changes at the third space to be intermediate between the phase of volume displacements in the first and second spaces; and with a third product delivery means communicating with the third flow path end so as to withdraw gas concentrated in a gas component whose readiness of adsorption is intermediate between the first and second components.

28. The apparatus of claim 18, in which the flow path is branched at an intermediate node to form a flow path branch through a feed adsorbent bed to a feed end of the flow path branch, the feed end of the flow path branch communicating with the feed supply means and an exhaust valve means, with means to open the feed supply valve during intervals of high pressure and open the exhaust valve during intervals of low pressure, so that a strongly adsorbed vapour contained in the feed gas mixture will be adsorbed in the feed adsorbent bed and purged through the exhaust valve, thus providing means to remove the strongly adsorbed vapour.

29. Apparatus for separating the components of a fluid mixture, one of the first and second components being more readily adsorbed under increase of pressure relative to the other component which is less readily adsorbed under increase of pressure over an adsorbent material under the operating conditions of the apparatus; the apparatus including an adsorbent bed of the adsorbent material with a flow path through the adsorbent bed within a working space, feed supply means to introduce the gas mixture to the flow path, means to generate cyclic reversing flow in the flow path at a cyclic frequency, and hydraulic volume displacement means to cyclically change the volume of the working space at the cyclic frequency so as to generate cyclic pressure variations of the gas in the flow path, with the displacer piston and the hydraulic volume displacement means operated in relative phase so that the pressure is relatively increased when the gas is flowing in a first direction in the flow path and relatively decreased when the gas is flowing in the reverse direction in the flow path; the apparatus being further characterized in that:

(a) the hydraulic volume displacement means includes means to cyclically vary the volume of a displacement liquid in a volume displacement chamber, as means to transfer volume displacements and pressure changes between the displacement liquid and the gas in the working space, and to provide the volume changes of the working volume, (b) the apparatus has means to balance internal energy storage to be approximately constant, so as to minimize peak power requirements.

30. The apparatus of claim 29 as a first apparatus paired with a second apparatus similar to the first apparatus but cycling in opposite phase, and with a pump means as the means to cyclically vary the volume of the displacement liquid in a volume displacement chamber of the first apparatus and in opposite phase of the second apparatus, and thus as means to provide cyclically reversing flow to operate the hydraulic volume displacement means of the first and second apparatus, with means to store kinetic energy in the flowing liquid and reversing pump means such that the cyclic changes of kinetic energy are approximately equal and opposite to the cyclic changes of potential energy associated with gas pressure changes in the working spaces.

31. The apparatus of claim 29, further characterized in that the hydraulic volume displacement means includes means to substantially prevent contact between the gas in the working space and the displacement liquid.

32. The apparatus of claim 29, in which the means to generate cyclic reversing flow in the flow path is a displacer piston means.

33. The apparatus of claim 32 as a first apparatus cooperating with a second apparatus, third apparatus and fourth apparatus similar to the first apparatus; and with a first variable flow pump as means to cyclically vary the volume of the displacement liquid both in the volume displacement chamber of the first apparatus and in opposite phase in the volume displacement chamber of the second apparatus, and a second variable flow pump as means to cyclically vary the volume of the displacement liquid both in the volume displacement chamber of the third apparatus and in opposite phase in the volume displacement chamber of the fourth apparatus; and with pump drive means mechanically coupling the first variable flow pump to a second variable flow pump, and a control means cooperating with the pump drive means to establish the same reversing flow amplitude of displacement liquid through the variable flow pumps, and to establish a phase shift of 90° between the flows in the first and second variable flow pumps, so as to balance total stored potential and kinetic energies, and to minimize peak power demand.

34. The apparatus of claim 29, in which the means to balance internal energy storage to be approximately constant is provided by inertial coupling means to determine the amplitude of variation of kinetic energy within the apparatus at the cyclic frequency, including the kinetic energy contribution of flowing displacement liquid, to be approximately equal to the amplitude of variation of potential energy within the apparatus, including energy of compression.

35. Apparatus for separating the components of a fluid mixture, one of the first and second components being more readily adsorbed under increase of pressure relative to the other component which is less readily adsorbed under the operating conditions of the apparatus; the apparatus including an adsorbent bed of the adsorbent material with a flow path through the adsorbent bed, feed supply means to introduce the gas mixture to the flow path, means to generate a cyclic flow in the flow path with the flow reversing at a cyclic frequency, and means to generate cyclic pressure variations of the gas in the flow path and at the cyclic frequency with phase coordinated so that the pressure is relatively increased when the gas is flowing in a first direction in the flow path and relatively decreased when the gas is flowing in the reverse direction in the flow path; the apparatus being further characterized in that:

(a) the adsorbent bed comprises multiple layers of sheet material, said sheet material including the adsorbent material and a reinforcement material, with a half sheet adsorbent thickness defined as the effective thickness of the adsorbent material on each side of the sheet material, (b) substantially the entire flow path through the absorbent bed is provided by channels between adjacent layers of the sheet material, said channels having a gap width between the adjacent layers of sheet materials, and spacer means to establish the gap width, (c) the gap width and length of all the channels is established to be substantially identical, so as to maintain substantially uniform flow distribution transverse to the flow path.

36. The apparatus of claim 35, in which the adjacent layers of sheet material are separate flat sheets.

37. The apparatus of claim 35, in which the adjacent layers of sheet material are formed by the same sheet in a spiral roll.

38. The apparatus of claim 35, in which the sheet material has macroporosity to facilitate adsorption mass transfer.

39. The apparatus of claim 35, in which the ratio of the channel gap width to the half sheet adsorbent thickness is between about 0.5 and 2.0.

40. The apparatus of claim 35, in which the channel step width is between about 5 and about 200 microns.

41. The apparatus of claim 40, in which the channel width is between about 15 and about 75 microns.

42. The apparatus of claim 35, in which the absorbent material is a zeolite adsorbent, and the reinforcement material and spacers are comprised of glass fibres.

43. The apparatus of claim 42, further including a clay binder.

44. The apparatus of claim 35, in which the reinforcement material is a metal foil or glass fibre fabric, and the adsorbent material is provided as a coating on the reinforcement material.

* * * * *